(12) United States Patent
Kong

(10) Patent No.: US 7,543,750 B2
(45) Date of Patent: Jun. 9, 2009

(54) LASER VELOCIMETRIC IMAGE SCANNING

(75) Inventor: Yuan Kong, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 651 days.

(21) Appl. No.: 11/268,747

(22) Filed: Nov. 8, 2005

(65) Prior Publication Data

US 2007/0102523 A1    May 10, 2007

(51) Int. Cl.
*G06K 19/06* (2006.01)
(52) U.S. Cl. .............................. 235/462.16; 235/462.01
(58) Field of Classification Search ............ 235/462.16, 235/462.42, 462.02, 462.19, 462.01
See application file for complete search history.

(56) References Cited

U.S. PATENT DOCUMENTS

| | | | |
|---|---|---|---|
| 3,954,335 A | 5/1976 | Bodlaj |
| 4,240,745 A | 12/1980 | Green |
| 4,379,968 A | 4/1983 | Ely et al. |
| 4,417,824 A | 11/1983 | Paterson et al. |
| 4,641,026 A | 2/1987 | Garcia |
| 4,721,385 A | 1/1988 | Jelalian et al. |
| 4,794,384 A | 12/1988 | Jackson |
| 5,114,226 A | 5/1992 | Goodwin et al. |
| 5,125,736 A | 6/1992 | Vaninetti et al. |
| 5,274,361 A | 12/1993 | Snow |
| 5,274,363 A | 12/1993 | Koved et al. |
| 5,369,262 A | 11/1994 | Dvorkis et al. |
| 5,475,401 A | 12/1995 | Verrier et al. |
| 5,510,604 A | 4/1996 | England |
| 5,515,045 A | 5/1996 | Tak |
| 5,629,594 A | 5/1997 | Jacobus et al. |
| 5,781,297 A | 7/1998 | Castore |
| 5,808,568 A | 9/1998 | Wu |
| 5,994,710 A | 11/1999 | Knee et al. |
| 6,015,089 A | 1/2000 | Hecht et al. |
| 6,040,914 A | 3/2000 | Bortz et al. |
| 6,246,482 B1 | 6/2001 | Kinrot et al. |
| 6,300,940 B1 | 10/2001 | Ebina et al. |
| 6,303,924 B1 | 10/2001 | Adan et al. |
| 6,333,735 B1 | 12/2001 | Anvekar |

(Continued)

FOREIGN PATENT DOCUMENTS

EP    1107101    6/2001

(Continued)

OTHER PUBLICATIONS

Nokia 7110 Phone Features, www.nokia.com/nokia/0,87643598,00.html, Aug. 23, 2005, 3 pp.
Sony Ericsson Mobile Communications-Home Page-Sony Ericcson-T206, www//sonyericsson.co/spg.jspcc-32 global&Ic=en=&ver=4001&template=ps1_1_5_4&zone=ps&Im=ps1_1&pid=9946, Aug. 23, 2005, 2 pp.

(Continued)

*Primary Examiner*—Edwyn Labaze
(74) *Attorney, Agent, or Firm*—Merchant & Gould P.C.

(57) ABSTRACT

A bar code scanner includes a self-mixing laser sensor. A frequency of the signal output by that sensor is used to determine scanner velocity relative to the bar code, and an amplitude of that signal is used to determine color of bar code bands. Using velocity and amplitude data collected at multiple times during a scan of the bar code, the widths of the bands are calculated. An imaging scanner includes a laser velocimeter that generates velocity data. Using that velocity data, relative displacement between image frames is determined.

13 Claims, 23 Drawing Sheets

U.S. PATENT DOCUMENTS

| | | | |
|---|---|---|---|
| 6,373,047 | B1 | 4/2002 | Adan et al. |
| 6,489,934 | B1 | 12/2002 | Klausner |
| 6,525,677 | B1 | 2/2003 | Printzis |
| 6,552,713 | B1 | 4/2003 | Van Brocklin et al. |
| 6,585,158 | B2 | 7/2003 | Norskog |
| 6,646,723 | B1 | 11/2003 | Dubovitsky et al. |
| 6,687,274 | B2 | 2/2004 | Kahen |
| 6,707,027 | B2 | 3/2004 | Liess et al. |
| 6,868,433 | B1 | 3/2005 | Philyaw |
| 6,872,931 | B2 | 3/2005 | Liess et al. |
| 6,903,662 | B2 | 6/2005 | Rix et al. |
| 7,085,584 | B2 | 8/2006 | Shima |
| 7,138,620 | B2 | 11/2006 | Trisnadi et al. |
| 7,268,705 | B2 | 9/2007 | Kong |
| 7,283,214 | B2 | 10/2007 | Xu et al. |
| 2001/0035861 | A1 | 11/2001 | Ericson et al. |
| 2001/0055195 | A1 | 12/2001 | Suzuki |
| 2002/0117549 | A1 | 8/2002 | Lee |
| 2002/0130183 | A1 | 9/2002 | Vinogradov et al. |
| 2002/0158838 | A1 | 10/2002 | Smith et al. |
| 2002/0198030 | A1 | 12/2002 | Shima |
| 2003/0006367 | A1 | 1/2003 | Liess et al. |
| 2003/0085284 | A1 | 5/2003 | Bremer et al. |
| 2003/0085878 | A1 | 5/2003 | Luo |
| 2003/0128188 | A1 | 7/2003 | Wilbrink et al. |
| 2003/0128190 | A1 | 7/2003 | Wilbrink et al. |
| 2003/0132914 | A1 | 7/2003 | Lee |
| 2003/0136843 | A1* | 7/2003 | Ralph et al. ............ 235/462.33 |
| 2003/0142288 | A1 | 7/2003 | Kinrot et al. |
| 2004/0004128 | A1 | 1/2004 | Pettinelli et al. |
| 2004/0004603 | A1 | 1/2004 | Gerstner et al. |
| 2004/0075823 | A1 | 4/2004 | Lewis et al. |
| 2004/0095323 | A1 | 5/2004 | Ahn |
| 2004/0010919 | A1 | 6/2004 | Miyamoto et al. |
| 2004/0213311 | A1 | 10/2004 | Johnson et al. |
| 2004/0227954 | A1 | 11/2004 | Xie |
| 2004/0228377 | A1 | 11/2004 | Deng et al. |
| 2004/0246460 | A1 | 12/2004 | Auracher et al. |
| 2005/0007343 | A1 | 1/2005 | Butzer |
| 2005/0044179 | A1 | 2/2005 | Hunter |
| 2005/0068300 | A1 | 3/2005 | Wang et al. |
| 2005/0134556 | A1 | 6/2005 | VanWiggeren et al. |
| 2005/0156875 | A1 | 7/2005 | Kong |
| 2005/0157202 | A1 | 7/2005 | Lin et al. |
| 2005/0168445 | A1 | 8/2005 | Piot et al. |
| 2005/0179658 | A1 | 8/2005 | Huang et al. |
| 2005/0231484 | A1 | 10/2005 | Gordon et al. |
| 2005/0243055 | A1 | 11/2005 | Ranta et al. |
| 2006/0066576 | A1 | 3/2006 | Kong |
| 2006/0213997 | A1 | 9/2006 | Frank et al. |
| 2006/0245518 | A1 | 11/2006 | Wang |
| 2006/0262096 | A1 | 11/2006 | Panabaker et al. |
| 2007/0002013 | A1 | 1/2007 | Kong et al. |
| 2007/0109267 | A1 | 5/2007 | Guo et al. |
| 2007/0109268 | A1 | 5/2007 | Guo et al. |

FOREIGN PATENT DOCUMENTS

| | | |
|---|---|---|
| EP | 1107101 A2 | 6/2001 |
| GB | 2383231 A | 6/2003 |
| WO | 0028455 | 5/2000 |
| WO | WO 00/28455 | 5/2000 |
| WO | WO2005/055037 | 6/2005 |
| WO | WO 2005/076116 A2 | 8/2005 |

OTHER PUBLICATIONS

U.S. Official Action mailed Jun. 26, 2007 in U.S. Appl. No. 11/087,263.

U.S. Official Action mailed Aug. 7, 2007 in U.S. Appl. No. 10/953,107.

U.S. Official Action mailed Nov. 14, 2007 in U.S.Appl. No. 11/087,263.

U.S. Official Action mailed Jan. 16, 2008 in U.S. Appl. No. 10/953,107.

U.S. Official Action mailed May 2, 2008 in U.S. Appl. No. 11/135,061.

U.S. Official Action mailed Jun. 25, 2008 in U.S. Appl. No. 11/272,415.

U.S. Official Action mailed Jul. 15, 2008 in U.S. Appl. No. 11/170,182.

U.S. Official Action mailed Jul. 31, 2008 in U.S. Appl. No. 10/953,107.

U.S. Office Action mailed Jun. 13, 2008 in U.S. Appl. No. 11/170,182.

U.S. Office Action mailed Jul. 15, 2008 in U.S. Appl. No. 11/170,182.

D. Dupuy, et al., "Improvement of the FMCW Laser Range-Finder by an APD Working as on Optoelectronic Mixer," IEEE Transactions on Instrumentation and Measurement, 51, 5, pp. 1010-1014, 2002.

R.P. Griffiths, et al., "Cavity-Resonant Optical Position Sensor- a New Type of Optical Position Sensor," p. 328, CLEO, 1998.

Hewett, Jacqueline, "Holey VCSELs Produce High Powers", <http://www.optics.org/articles/news/10/12/5/1>, date of first publication unknown, but dated Dec. 2004; 2 pages.

"Ultra-miniature Laser Displacement Sensors", <http://www.globalspec.com/FeaturedProducts/Detail/BaumerElectric/Ultraminiature_Laser_Displacement_Sensors/13470/1>, first date of publication unknown, but prior to Sep. 12, 2005, 2 pages.

Nerin, P., et al., "Absolute Distance and Velocity Measurements by the FMCW Technique and Self-Mixing Interference Effect Inside a Single-Mode Nd:YAG-LiTaO$_3$ Microchip Laser", Journal of Optics, vol. 29, No. 3, Jun. 1998.

Lowery, James, et al., "Design and Simulation of a Simple Laser Rangefinder Using a Semiconductor Optical Amplifier-Detector", Optics Express, vol. 13, No. 10, May 16, 2005; pp. 3647-3652.

Maier, T., et al., "A Compact Sensor for Interferometric Displacement Measurements", <http://www.fke.tuwien.ac.at/Publications/jb/fdjb99/tm.htm>, first date of publication unknown, but dated 1999, 2 pages.

"Laser Sensors Offer Long Stand-off and Measurement Range", ThomasNet Industrial news Room, <http://www.news.thomasnet.com/fullstory/458005/1782>, date of first publication unknown, but dated Dec. 3, 2004, 5 pages.

T. Bosch, et al., "The Self-Mixing Interference Inside a Laser Diode: Application to Displacement, Velocity and Distance Measurement", Proc. SPIE, vol. 3478, pp. 98-108, Jul. 1998.

Shigenobu Shinohara, et al., "Compact and High-Precision Range Finder with Wide Dynamic Range and its Application", IEEE Transactions on Instrumentation and Measurement, vol. 41, No. 1, pp. 40-44, Feb. 1992.

Roland E. Best, "Phase-Locked Loops, Theory, Design, and Applications", McGraw-Hill Book Company, pp. 151-164, 1984 (15 pages).

H. Yeh, et al., "Localized Fluid Flow Measurements with an He-Ne Laser Spectrometer", Appl. Phys. Lett., vol. 4, No. 10, pp. 176-178, May 15, 1964.

S.W. James, et al., "Fiber Optic Based Reference Beam Laser Doppler Velocimetry", Optics Communications, 119, pp. 460-464, Sep. 15, 1995.

M.J. Rudd, "A New Theoretical Model for the Laser Dopplermeter", J. Phys. E2, pp. 56-58, 1969.

M.J. Rudd, "A Laser Doppler Velocimeter Employing the Laser as a Mixer-Oscillator", J. Phys. E1, Series 2, vol. 1, pp. 723-726, Feb. 21, 1968.

T. Ito, et al., "Integrated Microlaser Doppler Velocimeter", J. Lightwave Tech., vol. 17, No. 1, pp. 30-34, Jan. 1999.

E.T. Shimizu, "Directional Discrimination in the Self-Mixing Type Laser Doppler Velocimeter", Appl. Opt., vol. 25, No. 21, pp. 4541-4544, Nov. 1987.

S.K. Özdemir, et al., "New Speckle Velocimeter Using Two Self-Mixing Laser Diodes", SICE 115C-3, pp. 947-950, Jul. 29-31, 1997.

S.L. Toh, et al., "Whole Field Surface Roughness Measurement by Laser Speckle Correlation Technique", Optics and Laser Technology, 33, pp. 427-434, Jun. 5, 2001.

M. Nagahara, et al., "Real-Time Blood Velocity Measurements in Human Retinal Vein Using the Laser Speckle Phenomenon", Japanese Journal of Ophthalmology, 43, pp. 186-195, 1999.

T. Shibata, et al., "Laser Speckle Velocimeter Using Self-Mixing Laser Diode", IEEE Transactions on Instrumentation and Measurement, vol. 45, No. 2, pp. 499-503, Apr. 2, 1996.

S. Kato, et al., "Optical Fibre Laser Doppler Velocimetry Based on Laser Diode Frequency Modulation", Optical and Laser Technology, vol. 27, No. 4, pp. xii, 1995.

W.H. Stevenson, "Optical Frequency Shifting by means of a Rotating diffraction Grating", Appl. Opt. 9, vol. 9, No. 3, pp. 649-652, Mar. 1970.

M.K. Mazumber, et al., "Laser Doppler Velocity Measurement Without Directional Ambiguity By Using Frequency Shifted Incident Beams", Appl. Phys. Lett., vol. 16, No. 1, pp. 462-464, Jun. 1, 1970.

S. Shinohara, et al., "Laser Doppler Velocimeter Using the Self-Mixing Effect of a Semiconductor Laser Diode", Appl. Opt., vol. 25, No. 9, pp. 1417-1419, 1986.

H.W. Jentink, et al., "Small Laser Doppler Velocimeter Based on the Self-Mixing Effect in a Diode Laser", Appl. Opt. vol. 27, No. 2, pp. 379-385, Jan. 15, 1998.

S. Shinohara, et al., "Acquisition of 3-D Image of Still or Moving Objects Utilizing Laser Diode Range-Finding Speedometer", IEEE, pp. 1730-1735, 1993.

L. Fabiny, et al., "Interferometric Fiber-Optic Doppler Velocimeter with High-Dynamic Range", IEEE Photonics Tech. Lett., vol. 9, No. 1, pp. 79-81, Jan. 1997.

S. Shinohara, et al., "Detection of Mesa Spots and Indents on Slowly Moving Object Surface by Laser-Light Beam Scanning", SICE, 105C-5, pp. 1167-1170, Jul. 26-28, 1995.

Y. Kakiuchi, et al., "Measurement of Small Vibrational Displacement by SM LD Vibrometer with Resonance Element", SICE, 107 A-4, pp. 903-906, Jul. 29-31, 1998.

N. Tsukuda, et al., "New Range-Finding Speedometer Using a Self-Mixing Laser Diode Modulated by Triangular Wave Pulse Current", IEEE, WEAM 4-1, pp. 332-335, May 1994.

Roy Lang, et al., "External Optical Feedback Effects on Semiconductor Injection Laser Properties", IEEE Journal of Quantum Electronics, vol. QE-16, No. 3, pp. 347-355, Mar. 3, 1980.

Acket, G., et al., "The Influence of Feedback Intensity on Longitudinal Mode Properties and Optical Noise in Index-Guided Semiconductor Lasers", IEEE Journal of Quantum Electronics, vol. QE-20, No. 10, pp. 1163-1169, Oct. 1984.

P.J. de Groot, et al., "Ranging and Velocimetry Signal Generation in a Backscatter-Modulated Laser Diode", Appl. Opt., vol. 27, No. 21, pp. 4475-4480, Nov. 1988.

P.A. Porta, "Laser Doppler Velocimetry by Optical Self-Mixing in Vertical-Cavity Surface-Emitting Lasers", IEEE Photonics Technology Letters, vol. 14, No. 12, pp. 1719-1721, Dec. 2002.

S.K. Özdemir, et al., "Effect of Linewidth Enhancement Factor on Doppler Beat Waveform Obtained From a Self-Mixing Laser Diode", Optical Review, vol. 7, No. 6, pp. 550-554, Jun. 22, 2000.

S. Shinohara, et al., "Compact and Versatile Self-Mixing Type Semiconductor Laser Doppler Velocimeters with Direction-Discrimination Circuit", IEEE Transactions on Instrumentation and Measurement, vol. 38, No. 2, pp. 574-577, Apr. 1989.

James H. Churnside, "Laser Doppler Velocimetry by Modulating a $CO_2$ Laser with Backscattered Light", Appl. Opt., vol. 23, No. 1, pp. 61-66, Jan. 1984.

M.H. Koelink, et al., "Laser Doppler Velocimeter Based on the Self-Mixing Effect in a Fiber-Coupled Semiconductor Laser: Theory", Appl. Opt., vol. 31, No. 18, pp. 3401-3408, Jun. 20, 1992.

W.M. Wang, et al., "Self-Mixing Interference in a Diode Laser: Experimental Observations and Theoretical Analysis", Appl. Opt., vol. 32, No. 9, pp. 1551-1558, Mar. 20, 1993.

Guido Giuliani, et al., "Laser Diode Self-Mixing Technique for Sensing Applications", J. Opt. A: Pure Appl. Opt, 4, vol. 4, No. 6, pp. S283-S294, Nov. 4, 2002.

Richard C. Addy, et al., "Effects of External Reflector Alignment in Sensing Applications of Optical Feedback in Laser Diodes", IEEE Journal of Lightwave Technology, Dec. vol. 14, No. 12, pp. 2672-2676, Dec. 1996.

S.F. Yu, "Theoretical Analysis of Polarization Bistability in Vertical Cavity Surface Emitting Semiconductor Lasers", IEEE Journal of Lightwave Technology, vol. 15, No. 6, pp. 1032-1041, Jun. 1997.

F. Robert, et al., "Polarization Modulation Dynamics of Vertical-Cavity Surface-Emitting Lasers with an Extended Cavity", IEEE Journal of Quantum Electronics, vol. 33, No. 12, 2231-2239, Dec. 1997.

J. Danckaert, et al., "Minimal Rate Equations Describing Polarization Switching in Vertical-Cavity Surface-Emitting Lasers", Optics Communications, vol. 201, pp. 129-137, Jan. 2002.

J. Martin-Regalado, et al., "Polarization Properties of Vertical-Cavity Surface-Emitting Lasers", IEEE Journal of Quantum Electronics, vol. 33, No. 5, pp. 765-783, May 1997.

S. Donati, et al., "Laser Diode Feedback Interferometer for Measurement of Displacements Without Ambiguity", IEEE Journal of Quantum Electronics, vol. 31, No. 1, pp. 113-119, Jan. 1995.

K. Petermann, et al., "External Optical Feedback Phenomena in Semiconductor Lasers", IEEE Journal of Selected Topics in Quantum Electronics, vol. 1, No. 2, pp. 480-489, Jun. 1995.

"Optical Mouse Saves Space", <http://www.optics.org/articles/news/8/6/23/1>, date of first publication unknown, but believed to be Jun. 26, 2002.

Wu, Qingguang, et al., "New Vibrometer Using Self-Mixing Laser Diode Modulated with Triangular Current", Shizuoka University, Cleo/Pacific Rim/, pp. 290-291 (1997).

Besnard, Pascal, et al., "Microwave Spectra in External-Cavity Semiconductor Lasers: Theoretical Modeling of Multipass Resonances", IEEE Journal of Quantum Electronics, pp. 1713-1722. (Aug. 1994) vol. 30, No. 8.

Besnard, Pascal, et al., "Feedback Phenomena in a Semiconductor Laser Induced by Distant Reflectors", IEEE Journal of Quantum Electronics, pp. 1271-1284, (May 1993) vol. 29, No. 5.

Short Talk: Fitt's Law & Text Input, New Horizons, "Interface with Pre-Typing Visual Feedback for Touch Sensitive Keyboard", pp. 750-751, CHI 2003.

Bazin, G., et al., "A New Laser Range-Finder Based on FMCW-Like Method", IEEE Instrumentation and Measurement Technology Conference, (1996), pp. 90-93.

Peng, Gang, et al., "Design of 3-D Mouse Using Ultrasonic Distance Measurement", International Conference on Sensors and Control Techniques, pp. 226-229, (2000), Proceedings of SPEI, vol. 4077.

Shinohara, Shigenobu, et al., "High-Resolution Range Finder with Wide Dynamic Range of 0.2m to 1m Using a Frequency-Modulated Laser Diode", pp. 646-651, (1989), IEEE.

Bosch, Thierry, et al., "Three-Dimensional Object Construction Using a Self-Mixing Type Scanning Laser Range Finder", pp. 1326-1329, (1998), IEEE Transactions on Instrumentation and Measurement, vol. 47, No. 5.

Dorsch, Rainer G., et al., "Laser Triangulation: Fundamental Uncertainty in Distance Measurement", pp. 1306-1314, (1994), Applied Optics, vol. 33, No. 7.

Dupuy, D., et al., "A FMCW Laser Range-Finder Based on a Delay Line Technique", pp. 1084-1088, (2001), IEEE Instrumentation and Measurement Technology Conference.

Journet, B., et al., "High Resolution Laser Range-Finder Based on Phase-Shift Measurement Method", pp. 123-132, (1998), SPIE vol. 3520.

Favre-Bulle, Bernard, et al., "Efficient Tracking of 3D-Robot Positions by Dynamic Triangulation", pp. 446-449, (1998), IEEE ITMC Session on Instrumentation and Measurement in Robotics.

Bosch, T, et al., "A Low-Cost, Optical Feedback Laser Range-Finder with Chirp Control", (2001), IEEE Instrumentation and Measurement Technology Conference.

Tucker, John, "Laser Range Finder Using the Self-Mixing Effect in a Vertical Cavity Surface Emitting Laser" (VCSEL), pp. 1-71, (2001).

De Groot, Peter, et al., "Chirped Synthetic-Wavelength Interferometry", pp. 1626-1628, (1992), Optics Letters, vol. 17, No. 22.

Gelmini, E, et al., "Tunable, Double-Wavelength Heterodyne Detection Interferometer for Absolute-Distance Measurements", pp. 213-215, (1994), Optics Letters, vol. 19, No. 3.

IBM Technical Disclosure Bulletin, "Ultrasonic Cursor Position Detection", pp. 6712-6714, (1985), vol. 27, No. 11.

Tucker, J.R., et al., "Laser Range Finding Using the Self-Mixing Effect in a Vertical-Cavity Surface Emitting Laser", pp. 583-586, (2002), Conference on Optoelectronic and Microelectronic Materials and Devices.

Journet, B, et al., "A Low-Cost Laser Range Finder Based on an FMCW-Like Method", pp. 840-843 (2000), IEEE Transactions on Instrumentation and Measurement, vol. 49, No. 4.

Marques, Lino, et al., "3D Laser-Based Sensor for Robotics", pp. 1328-1331, (1994) ISR-Institute of Systems and Robotics.

Marques, Lino, et al., "A New 3D Optical Triangulation Sensor for Robotics", pp. 512-517, (1998), IEEE International Workshop on Advanced Motion Control.

Preucil, Libor, "Building a 2D Environment Map From Laser Range-Finder data", pp. 290-295, (2000), IEEE Intelligent Vehicle Symposium.

Nyland, Lars S., et al., "Capturing, Processing and Rendering Real-World Scenes", IEEE, 2001.

Onodera, Ribun, et al., "Effect of Laser-Diode Power Change on Optical heterodyne Interferometry", pp. 675-681, (1995), Journal of Lightwave Technology, vol. 13, No. 4.

Besesty, Pascal, et al., "Compact FMCW Advanced Laser Range Finder", pp. 552-553, (1999) Technical Digest: Conference on Lasers and Electro-Optics.

Poujouly, Stephane, et al., Digital Laser Range Finder: Phase-Shift Estimation by Undersampling Technique, pp. 1312-1317, (1999), IEEE.

Zheng, Jiang A., "A Flexible Laser Range Sensor Based on Spatial-Temporal Analysis", (2000), Proceedings of the International Conference on Pattern Recognition.

Dandliker, R., et al., "Two-Wavelength Laser Interferometry Using Superheterodyne Detection", pp. 339-341, Optics Letters, (1998) vol. 13, No. 5.

Zou, Q., et al. "Silicon Capacitive Microphones with Corrugated Diaphragms", School of Mechanical and Production Engineering, Nanyang Technological University; date of first publication unknown, but believed to be prior to Sep. 30, 2003.

Rombach, Pirmin, et al., "A Low-Voltage Silicon Condenser Microphone for Hearing Instrument Applications, Microtronic A/S"; date of first publication unknown, but believed to be prior to Sep. 30, 2003.

Shinoda, Yukitaka, et al., "Real-Time Computation of Distance and Displacement by Software Instruments Using Optical Frequency Modulation", pp. 82-83, (2002), SICE.

Cole, Timothy, et al., "Flight Characterization of the Near Laser Rangefinder", pp. 131-142, (2000), Laser Radar Technology and Applications, Proceedings of SPIE vol. 4035.

Viarani, Luigi, et al., "A CMOS Smart Pixel for Active 3-D Vision Applications", pp. 145-152, (2004), IEEE Sensors Journal, vol. 4, No. 1.

Wakitana, Jun, et al., "Wrist-Mounted Laser Rangefinder", pp. 362-367, (1995) Proceedings of the International Conference on Intelligent Robots and Systems.

Zahid, M., et al., "High-Frequency Phase Measurement for Optical Rangefinding System", pp. 141-148, (1997), IEEE Proceedings Science and Measurements Technology, vol. 144, No. 3.

Whetstone, Albert, "Free-Hand Data Input", pp. 11-28, Science Accessories Corporation (1970).

Acroname Articles, Demystifying the Sharp IR Rangers, <http://www.acroname.com/rootics/info/articles/sharp/sharp.html> (First published before Sep. 14, 2004).

Gagnon, Eric, "Laser Range Imaging Using the Self-Mixing Effect in a Laser Diode", pp. 693-699, (1999), IEEE Transaction on Instrumentation and Measurement, vol. 48, No. 3.

Canesta, Inc., "Data Input Alternatives for Mobile Devices", pp. 1-5, Nov. 28, 2002.

Steinmetz, Robert, et al., "Solving the Data Input Problem in Mobile Devices", pp. 1-6, Sep. 2002.

Tomasi, Carlo, et al., "Full Size Projection Keyboard for Handheld Devices", pp. 70-75, (2003) Communications of the ACM, vol. 46, No. 7.

Hebert, Martial, "Active and Passive Range Sensing for Robotics", pp. 102-110, (2000) IEEE International Conference for Robotics and Automation.

"Laser-Based Tracking for Real-Time 3D Gesture Acquisition", <http://www.k2.t.u-tokyo.ac.jp/fusion/LaserActiveTracking/index-e.html>; first published on or before Aug. 3, 2004.

Aeroflex Mixed-Signal Asics, "Choosing an Ultrasonic Sensor for Proximity or Distance Measurement", Part 1: Acoustic Considerations <http://www.sensorsmag.com/articles/0299/acou0299/main.shtml>; first published in 1999.

Aeroflex Mixed-Signal Asics, "Choosing an Ultrasonic Sensor for Proximity or Distance Measurement", Part 2: Optimizing Sensor Selection <http://www.sensormag.com/articles/0399/0399_28/main.shtml>; first published in 1999.

Canesta Keyboard <http://www.canesta.com/cansetakeyboard.htm>; first published on or after Aug. 3, 2004.

Canesta Keyboard, <http://www.canesta.com/faq.htm>; first published on or after Aug. 3, 2004.

Sahin Kaya Ozdemir, et al., "Velocity Measurement by a Self-Mixing Laser Diode Using Speckle Correlation", IEEE, 1999, pp. 1756-1760.

Wang, W.M., et al., "Self-Mixing Interference Inside a Single-Mode Diode Laser for Optical Sensing Applications," pp. 1577-1587, Journal of Lightwave Technology, vol. 12, No. 9 (1994).

Shaked, Doron, et al., "Graphical Indicia", 2.2 Barcode-Reading Sub-System, <http://www.hpl.hp.com/research/isl/vsb/GraphlndicialCIP.pdf>, first date of publication unknown but, on or berofe Oct. 13, 2005, 4 pages.

Tsau, Jiunnijye, et al., "2D Micro Scanner Actuated by Sol-gel Derived Double Layered PZT", National Institute of Advanced Industrial Science and Technology (AIST), <http://toshi.fujita3.iis.u-tokyo.ac.jp/Optical_MEMS_Archives/MEMS%202002/Book/135.PDF>, first date of publication unknown, but on or before 2002, pp. 548-551.

Sasaki, Minoru, et al., "Optical Scanner on a Tree-Dimensional Microoptical Bench", Journal of Lighwave Technology, vol. 21, Issue 3, 602, Mar. 2003, <http://jlt.osa.org/abstract/cfm?id=72540>, 1 page.

Liess, Martin, et al., "A Miniaturized Multidrectional Optical Motion Sensor and Input Device Based on Laser Self-Mixing", Meas. Sci. Technol. 13, 2001-2006; <http://www.iop.org/EJ/abstract/0957-0233/13/12/327>, Nov. 1, 2001; Issue 12; 2 pages.

Gokturk, S. Burak, et al., "A Time-Of-Flight Depth Sensor—System Description, Issues and Solutions," *cvprw*, p. 35, 2004 Conference on Computer Vision and Pattern Recognition Workshop (CVPRW'04), vol. 3, 2004, 9 pages.

"How Does 3DV's Technology Work?", <http://www.3dvsystems.com/technology/technology.html>, first date of publication unknown but on or before Oct. 13, 2005, 7 pages.

Gokturk, Salih Burak, et al., "3D Head Tracking Based on Recognition and Interpolation Using a Time-of-Flight Depth Sensor," *cvpr*, pp. 211-217, 2004 IEEE Computer Society Conference on Computer Vision and Pattern Recognition (CVPR'04)—vol. 2, 2004, 7 pages.

U.S. Appl. No. 10/953,107, filed Sep. 30, 2004.

U.S. Appl. No. 11/154,828, filed Jun. 17, 2005.

U.S. Appl. No. 11/170,182, filed Jun. 30, 2005.

U.S. Appl. No. 11/249,682, filed Oct. 14, 2005.

Logitech® G7 Laser Cordless Mouse; <http://www.logitech.com/index.cfm/products/details/US/EN, CONTENTID=10716>; date of first publication unknwon, but on or before Oct. 24, 2005; 3 pages. CRID=2135, Logitech® MX™ 1000 Laser Cordless Mouse; <http://www.logitech.com/index.cfm/products/details/US/EN,CRID=3,CONTENTID=9043, a d=g03&srch=1>; date of first publication unknown, but on or before Oct. 24, 2005; 3 pages.

5-Button USB Laser Mouse; <http://www.iogear.com/main.php?loc=product&Item=GME521>; date of first publication unknwon, but on or before Oct. 24, 2005; 3 pages.

Houghton, Andrew, et al., "A Method for Processing Laser Speckle Images to Extract High-Resolution Motion" pp. 611-617, Meas. Sci. Technol. 8 (1997), published Feb. 24, 1997.

Yamaguchi, Ichirou, et al., "Stabilized and Accelerated Speckle Strain Gauge", SPIE Conference on Laser Interferometry: Quantitative Analysis of Interferograms: Third in a Series, Aug. 1989; published Sep. 22, 1991; 8 pages.

Taka, Nobukatsu, et al., Displacement Measurement of Speckles Using a 2-D Level-cross Technique, Applied Optics, vol. 22, No. 22, published Nov. 15, 1983; pp. 3514-3519.

U.S. Office Action mailed Dec. 30, 2008 in U.S. Appl. No. 11/170,182.

Poujouly et al., "Digital Laser Range Finder: Phase-Shift Estimation by Undersampling Technique", IEEE, 1999, pp. 1312-1317.

U.S. Office Action mailed Oct. 20, 2008 in U.S. Appl. No. 11/268,747.

* cited by examiner

| time index | amplitude | velocity |
|---|---|---|
| $t_0$ | $a(t_0)$ | $v(t_0)$ |
| $t_1$ | $a(t_1)$ | $v(t_1)$ |
| ⋮ | ⋮ | ⋮ |
| $t_{q-1}$ | $a(t_{q-1})$ | $v(t_{q-1})$ |
| $t_q$ | $a(t_q)$ | $v(t_q)$ |
| $t_{q+1}$ | $a(t_{q+1})$ | $v(t_{q+1})$ |
| ⋮ | ⋮ | ⋮ |
| $t_{r-3}$ | $a(t_{r-3})$ | $v(t_{r-3})$ |
| $t_{r-2}$ | $a(t_{r-2})$ | $v(t_{r-2})$ |
| $t_{r-1}$ | $a(t_{r-1})$ | $v(t_{r-1})$ |
| $t_r$ | $a(t_r)$ | $v(t_r)$ |
| ⋮ | ⋮ | ⋮ |
| $t_{s-1}$ | $a(t_{s-1})$ | $v(t_{s-1})$ |
| $t_s$ | $a(t_s)$ | $v(t_s)$ |
| $t_{s+1}$ | $a(t_{s+1})$ | $v(t_{s+1})$ |
| $t_{s+2}$ | $a(t_{s+2})$ | $v(t_{s+2})$ |
| ⋮ | ⋮ | ⋮ |
| $t_{u-1}$ | $a(t_{u-1})$ | $v(t_{u-1})$ |
| $t_u$ | $a(t_u)$ | $v(t_u)$ |
| ⋮ | ⋮ | ⋮ |
| $t_{last}$ | $a(t_{last})$ | $v(t_{last})$ |
| ⋮ | ⋮ | ⋮ |
| $t_z$ | $a(t_z)$ | $v(t_z)$ |

| frame no. | time index | velocity |
|---|---|---|
| 81 | $t_0$ | $v(t_0)$ |
| | $t_1$ | $v(t_1)$ |
| | ⋮ | ⋮ |
| | $t_{p-1}$ | $v(t_{p-1})$ |
| 82 | $t_p$ | $v(t_p)$ |
| | $t_{p+1}$ | $v(t_{p+1})$ |
| | ⋮ | ⋮ |
| | $t_{q-1}$ | $v(t_{q-1})$ |
| 83 | $t_q$ | $v(t_q)$ |
| | $t_{q+1}$ | $v(t_{q+1})$ |
| | ⋮ | ⋮ |
| | $t_{r-1}$ | $v(t_{r-1})$ |
| 84 | $t_r$ | $v(t_r)$ |
| | $t_{r+1}$ | $v(t_{r+1})$ |
| | ⋮ | ⋮ |
| | $t_{s-1}$ | $v(t_{s-1})$ |
| 85 | $t_s$ | $v(t_s)$ |

FIG. 13

| frame no. | time index | x velocity | y velocity |
|---|---|---|---|
| $FR_{t0}$ | $t_0$ | $v_x(t_0)$ | $v_y(t_0)$ |
|  | $t_1$ | $v_x(t_1)$ | $v_y(t_1)$ |
|  | ⋮ | ⋮ | ⋮ |
|  | $t_{p-1}$ | $v_x(t_{p-1})$ | $v_y((t_{p-1}))$ |
| $FR_{tp}$ | $t_p$ | $v_x(t_p)$ | $v_y((t_p))$ |
|  | ⋮ | ⋮ | ⋮ |

LASER VELOCIMETRIC IMAGE SCANNING

BACKGROUND

Optical scanning of a surface is a common operation performed in a variety of contexts. For example, there is often a need to create electronic data based on the appearance of a surface; optical scanning is a often crucial tool for fulfilling this need. One example of such scanning is reading of bar codes.

Numerous methods exist for reading bar codes. In various of these methods, it is necessary to control the speed with which a bar code is scanned. However, this can require complicated mechanisms (e.g., rotating mirrors), thereby increasing cost. If scanning speed is not controlled, it may be necessary to assume that a bar code is scanned at a constant rate. In such case, however, a bar coding scheme must be tolerant of variations in scanning rate (e.g., when scanned by a handheld scanner). In view of these and other issues, there remains a need for improvements in systems which can be used to scan a bar code.

Imaging is another area in which there is also need for improvements in scanning systems. One technique for creating images of a surface (e.g., a page of text or other information being scanned for digitization) requires moving an array of photosensitive elements relative to that surface. At multiple times during that movement, images are generated for portions of the surface from which the array can receive light. These portions (or "frames") can then be combined to create an image of a larger area of the scanned surface. However, this combination requires knowing the proper relative positions of frames relative to preceding and/or succeeding frames. In many existing systems, this is achieved by correlating surface features common to overlapping portions of adjacent frames. When such surface features are absent or hard to detect, however, problems can occur.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In at least some embodiments, laser velocimeter data is used to determine the distance a scanner has moved relative to a surface being scanned. In certain embodiments adapted to read a bar code, a self-mixing laser sensor may be employed. A frequency of the signal output by that sensor is used to determine velocity of the scanner relative to the bar code, and an amplitude of that signal is used to determine whether the beam is striking a first color band or a second color band. Using velocity and amplitude data collected at multiple times during a scan of the bar code, the widths of the bands are calculated. Certain other embodiments are adapted for imaging a scanned surface. In such embodiments, a laser velocimeter generates velocity data as image frames are created. The velocity data may also be generated at times between generation of successive image frames. Using the velocity data, the relative displacement between image frames is determined.

BRIEF DESCRIPTION OF THE DRAWINGS

The present invention is illustrated by way of example, and not by way of limitation, in the figures of the accompanying drawings and in which like reference numerals refer to similar elements and in which:

FIG. 13 is a table illustrating one manner in which data may be stored when scanning an image according to at least some embodiments.

DETAILED DESCRIPTION

In at least some embodiments, a laser self-mixing velocimeter is used to determine the velocity of a surface being scanned. This velocity information is then used to create data describing the scanned surface. In some cases, other data from a laser sensor is used to determine additional characteristics of the scanned surface.

Figure 1:
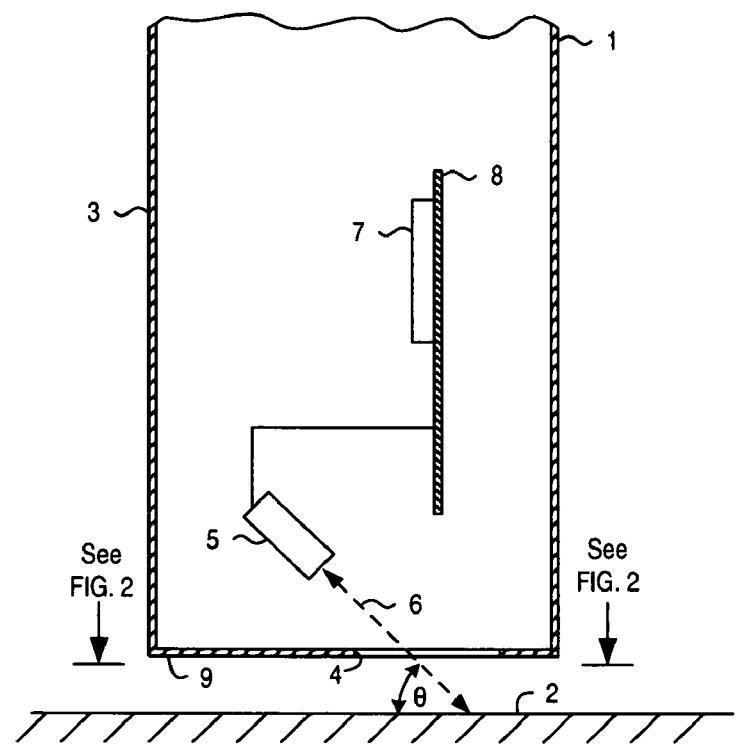
FIG. 1 is a block diagram of a bar code scanner according to at least some exemplary embodiments.
Figure 2:
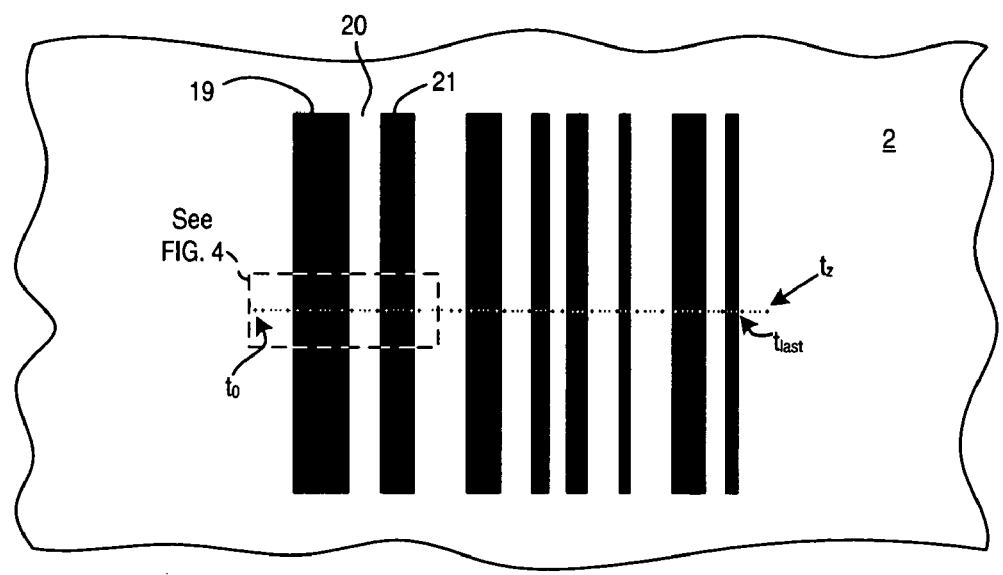
FIG. 2 shows an example of a bar code.

FIG. 1 is a block diagram of a bar-code scanner 1 according to at least some exemplary embodiments. In the embodiment of FIG. 1, scanner 1 is used to read a bar code on a surface 2. FIG. 2 shows an example of a bar code on surface 2. Scanner 1, which is in a cross-sectional view in FIG. 1, includes a housing 3 having an opening or window 4 formed therein. A laser sensor 5 is positioned within housing 3 to emit a beam 6 through window 4. Window 4 forms a scanning area which is moved across a bar code that is being read with scanner 1. Output from laser sensor 5 is provided to an integrated circuit (IC) 7 on a printed circuit board (PCB) 8. Although FIG. 1 shows a small separation between an underside 9 of scanner 1 and surface 2, underside 9 would (in at least some embodiments) rest flatly upon surface 2 during scanning. In this manner, and based on positioning of sensor 5 within housing 3, beam 6 is directed onto surface 2 at a known angle θ. In operation, scanner 1 is moved across surface 2 (e.g., by an operator's hand) so that beam 6 moves across the bar code being read. For simplicity, lenses, light guides and various other components are not shown in FIG. 1.

In the embodiment of FIG. 1, laser sensor 5 includes a vertical cavity surface emitting laser (VCSEL) and a photosensitive element (e.g., a photodiode or phototransistor). The photosensitive element measures the power of beam 6 and outputs an electrical signal based on the measured power. The operation of laser sensor 5 is described in more detail below in conjunction with FIG. 20A. In general, however, a portion of beam 6 is backscattered from surface 2 and returns to the emitting cavity of the VCSEL. Because of an effect commonly known as "self-mixing," interference between the outgoing beam 6 and the backscattered portion returning to the VCSEL causes the intensity of beam 6 to fluctuate. The change in the VCSEL output intensity is a function of, e.g., the roundtrip delay between the time that light leaves the laser and the time that the light is returned to the emitting cavity. If the laser's beam is backscattered from a moving target, the laser's power output will vary in a periodic manner. These power fluctuations, or "beats," have a frequency which corresponds to a Doppler shift associated with movement of that target away from (or toward) the laser. The beat frequency can thus be used to determine the velocity of the surface relative to the VCSEL.

Figure 3:
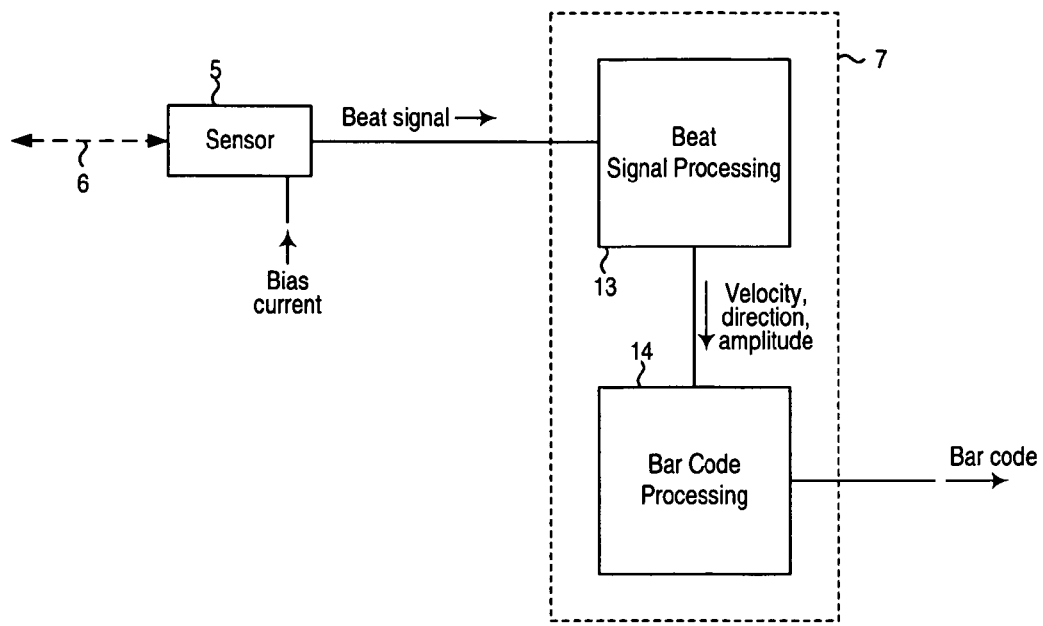
FIG. 3 is a block diagram showing components of the bar code scanner of FIG. 1.

FIG. 3 is a block diagram of laser sensor 5 and IC 7. The VCSEL within laser sensor 5 is driven by a bias current. Sensor 5 outputs a beat signal. The beat signal is processed by a beat signal processing circuit 13, examples of which are described in more detail below in conjunction with FIGS. 22-23B. In general, beat signal processing circuitry 13 determines a velocity of the sensor 5 relative to the bar code being scanned. This velocity information, together with information regarding the amplitude of the beat signal, is provided to bar code processing circuitry 14. In some embodiments, and as described below, beat signal processing circuitry 13 also provides information regarding the direction in which sensor 5 is moving relative to a scanned bar code. Based on the information received from beat processing circuitry 13, bar code processing circuitry 14 determines, e.g., the width of alternating black and white bands on the scanned bar code. Bar code processing circuitry 14 includes a microprocessor configured to calculate a bar code according to the algorithm described below.

Figure 4:
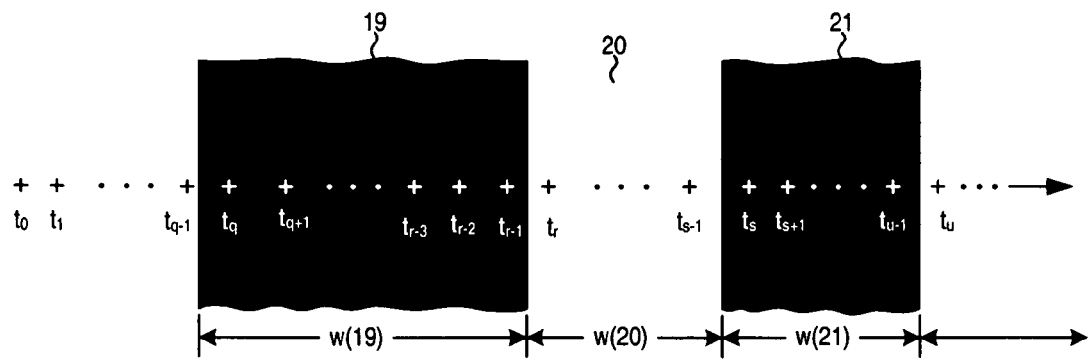
FIG. 4 is an enlargement of the bar code portion indicated in FIG. 2.

FIG. 4 is an enlargement of the bar code portion indicated in FIG. 2. That portion includes a black band 19 having a width w(19), a white band 20 having a width w(20), and another black band 21 having a width w(21). Also shown in FIG. 4 (with plus signs "+") are locations at which beam 6 strikes surface 2 during each of multiple velocimetric samplings. In particular, the VCSEL of sensor 5 is periodically activated to measure velocity, and then deactivated until the next velocity measurement. The first velocity measurement, taken at time index $t_0$, occurs when beam 6 is aimed at a point in front of band 19. The second measurement occurs at time $t_1$, with the samplings continuing in this manner until a stop condition is reached (time $t_z$ in FIG. 2). In some embodiments, the stop condition is the release of a "scan" button (not shown) on scanner 1. Other stop conditions can be employed, examples of which are provided below. The ellipses in FIG. 4 represent an arbitrary number of additional velocity measurements.

Figures 5, 7:
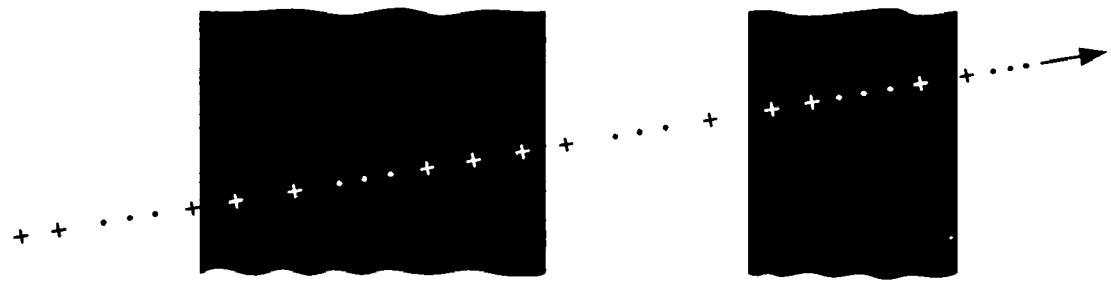
FIG. 5 is a table illustrating one manner in which data may be stored when scanning a bar code according to at least some embodiments.
FIG. 7 shows a path of a scanning beam across a bar code that is not perpendicular to the bands of the code.

Data for each velocity measurement is stored in a table or other data structure. FIG. 5 is a table illustrating one manner in which that data may be stored. A different time index corresponds to each time at which a velocity measurement is made. For each velocity measurement, the amplitude of the beat signal and the velocity of the scanned surface are stored. For simplicity, units are omitted in FIG. 5. A value "t_" (where "_" is 0, 1, q−1, etc.) is a time index for a particular velocity sampling. A value "v(t_)" is a velocity at time index t_. Velocity values are given a positive sign to indicate that scanner 5 is moving in one direction relative to a scanned surface, and a negative sign to indicate movement in an opposite direction. A value "a(t_)" is an amplitude measurement (e.g., peak-to-peak or RMS voltage) of the beat signal at a particular time index t_. The ellipses in FIG. 5 indicate the occurrence of, and data for, an arbitrary number of additional velocity samplings.

Using the data of FIG. 5, the width of each bar and the distance separating bars is determined. As previously indicated, the frequency of the beat signal from sensor 5 can be used to determine the velocity of sensor 5 relative to a scanned surface. Moreover, the amplitude of the beat signal can be used to determine whether the beam is striking a black or a white portion of the bar code. Because black surfaces are more absorptive (and backscatter less light) than white surfaces, the amplitude of the self-mixing power fluctuations in beam 6 is less for black surface backscattering than for white surface backscattering. The amount of light backscattered by a particular surface is also affected by characteristics other than target surface color. For example, a highly glossy surface of a given color may backscatter a different amount of light than a non-glossy surface having the same color. However, a black glossy surface backscatters less light than a white glossy surface. By comparing amplitudes of the beat signal at various times as beam 6 traverses a scanned bar code, each velocity measurement can be classified as beam movement over a black region or beam movement over a white region.

Figure 6:
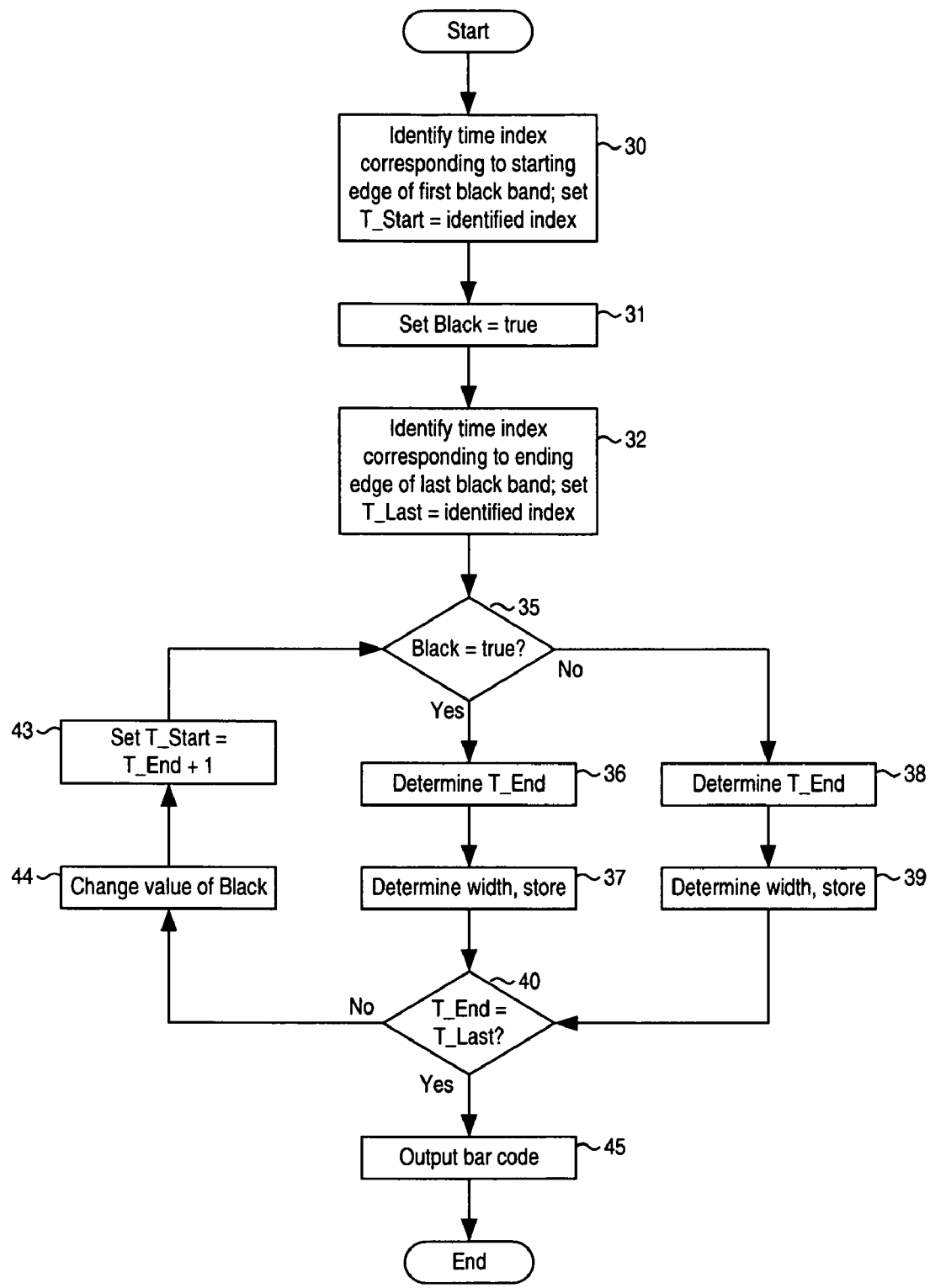
FIG. 6 is a flow chart showing one algorithm for determining a bar code from the data of FIG. 5.

FIG. 6 is a flow chart showing one algorithm for determining a bar code from data such as that in FIG. 5. The algorithm of FIG. 6 assumes that a bar code begins and ends with black bands. Beginning in block 30, the algorithm identifies the time index corresponding to the starting edge of the first black band in the bar code. To do so, the algorithm begins with the first velocity sampling interval ($t_0$) and examines amplitude data for each successive sampling interval until Condition 1A is satisfied.

$a(t_i) < K \cdot a(t_{i-1})$  Condition 1A

The time index $t_i$ for which Condition 1A is true corresponds to the first velocity measurement after a white-to-black transition. In Condition 1A, $a(t_i)$ is the beat signal amplitude for the velocity sampling interval having time index $t_i$, $a(t_{i-1})$ is the beat signal amplitude at previous time index $t_{i-1}$, and K is a factor derived from the average ratio of black region beat signal amplitude to white region beat signal amplitude. K may be determined based on data obtained experimentally for a given set of surface types. In at least some embodiments, K can be, e.g., 0.80 when the average ratio of black region beat signal amplitude to white region beat signal amplitude is 0.67. Other values of K (e.g., 0.7, 0.75, etc.) could be used.

In some cases, signal noise, scanned surface imperfections and other anomalies may affect the accuracy of bar edge determinations using Condition 1A. For example, a spot of dirt in a white band of a bar code might cause the beat signal amplitude to drop if the sensor beam strikes that dirt spot. Accordingly, a modified criterion such as Condition 1B can alternatively be employed to find a time index $t_i$ corresponding to the first velocity measurement after a white-to-black transition.

$$\frac{\sum_{j=0}^{m-1} a(t_{i+j})}{m} < K * \frac{\sum_{j=0}^{m-1} a(t_{i-1-j})}{m} \qquad \text{Condition 1B}$$

In Condition 1B, m is a number of velocity measurements over which beat signal amplitudes are averaged to reduce the effects of noise, dirt or other anomalies. Although various values could be used, m equals 3 in some embodiments. To speed processing when Condition 1B is used, m in each of the denominators of Condition 1B could be replaced with 1.

As yet another possible alternative, white-to-black band transitions can be determined based on a difference between the average white area amplitudes and the average black area amplitudes. In certain embodiments employing such an approach, all of the data in the table of FIG. 5 are first analyzed to calculate an average amplitude for white regions and an average amplitude for black regions. For example, a probability analysis would show the a(t_) values in FIG. 5 to generally be clustered about two central values, a lower value ($A_{black}$) corresponding to black regions and a higher value ($A_{white}$) corresponding to white regions. Once these two central values are identified, a time index $t_i$ corresponding to the first velocity measurement after a white-to-black transition can be identified using Condition 1C.

$$(a(t_{i-1}) - a(t_i)) \geq L * (A_{white} - A_{black}) \qquad \text{Condition 1C}$$

The value L is equal to, e.g., 0.25.

After identifying the time index corresponding to the starting edge of the first black band ($t_q$ in the present example), the variable T_Start is set equal to that time index. The purpose of the T_Start variable will become apparent in the description below. From block 30, the algorithm proceeds to block 31 and sets as "true" the value for the variable Black. As will also be apparent below, the variable Black is true when a black band width is being determined, and false when a white band width is being determined. From block 31, the algorithm proceeds to block 32. In block 32, the algorithm identifies the time index corresponding to the ending edge of the last black band. The variable T_Last is then set to equal that time index corresponding to the ending edge of the last black band. In the example of FIG. 2, that index is shown as $t_{last}$.

The determination in block 32 is made by commencing with the last time index ($t_z$) in the FIG. 5 table and examining amplitudes for sequentially earlier times. A time index $t_i$ corresponding to the last velocity measurement before the black-to-white transition for the last black band is identified. That time index $t_i$ can be found using, e.g., one of Conditions 2A, 2B or 2C.

$$a(t_i) < K * a(t_{i+1}) \qquad \text{Condition 2A}$$

$$\frac{\sum_{j=0}^{m-1} a(t_{i+j})}{m} < K * \frac{\sum_{j=0}^{m-1} a(t_{i+1+j})}{m} \qquad \text{Condition 2B}$$

$$(a(t_{i+1}) - a(t_i)) \geq L * (A_{white} - A_{black}) \qquad \text{Condition 2C}$$

The value K in Conditions 2A and 2B is, e.g., 0.80. As with Condition 1B, the m in each denominator of Condition 2B could be replaced with a 1 in order to speed processing. As with Condition 1C, and L in Condition 2C is equal to, e.g., 0.25.

From block 32, the algorithm proceeds to block 35. If the variable Black is true (as in the present example), the algorithm proceeds on the "yes" branch to block 36. In block 36, the algorithm identifies a time index corresponding to the ending edge of the band for which a width is currently being determined. In particular, the algorithm identifies the time index $t_i$ corresponding to the last velocity measurement before a black-to-white transition. That time index is found by examining amplitude data for successive time indices after T_Start until, e.g., one of Condition 3A, 3B or 3C is satisfied.

$$a(t_i) < K * a(t_{i+1}) \qquad \text{Condition 3A}$$

$$\frac{\sum_{j=0}^{m-1} a(t_{i-j})}{m} < K * \frac{\sum_{j=0}^{m-1} a(t_{i+1+j})}{m} \qquad \text{Condition 3B}$$

$$(a(t_{i+1}) - a(t_i)) \geq L * (A_{white} - A_{black}) \qquad \text{Condition 3C}$$

Conditions 3A-3C are respectively identical to Conditions 2A-2C, but are employed to evaluate amplitudes for successively later times until a time index $t_i$ is found for which the selected condition is true. After using one of Conditions 3A, 3B or 3C to find a time index corresponding to the end of the current black band ($t_{r-1}$ in the present example), the variable T_End is set to equal that identified time index.

From block 36, the algorithm proceeds to block 37 and calculates the width of the current band. The algorithm calculates that width by integrating over time the velocity data for the sampling intervals between T_Start and T_End. In some embodiments, the current band width (w) is determined using Equation 1.

$$w = \sum_{j=\text{T\_Start}+1}^{\text{T\_End}} \frac{(t_j - t_{j-1}) * (v_j + v_{j-1})}{2} \qquad \text{Equation 1}$$

In the present example for band 19, T_Start=$t_q$ and T_End=$t_{r-1}$. The calculated width is then stored, and the algorithm continues to block 40. As can be appreciated, directional changes will result in negative velocity values. A negative velocity will, in turn, result in an incremental decrease in a calculated value of w.

In block 40, the algorithm determines if T_End=T_Last. If not, the algorithm proceeds on the "no" branch to block 44 and changes the value of Black. In the present example, Black is currently set to "true." Accordingly, Black is set to "false" in block 44. The algorithm then continues to block 43, where the variable T_Start is reset to T_End+1. Because T_End is the time index corresponding to the end of the band just evaluated (band 19 in the present example), T_End+1 is the time index corresponding to the beginning of the next band (band 20). From block 43, the algorithm returns to block 35 and again tests the value of Black.

In this case, Black=false. Accordingly, the algorithm proceeds on the "no" branch to block 38 from block 35. In block 38, a new value for T_End is calculated. Because this requires searching for a white to black transition (e.g., a time index corresponding to the last velocity measurement before a white-to-black transition), amplitudes for time indices after T_Start are examined until a time index $t_i$ satisfying one of Conditions 4A, Condition 4B or Condition 4C is found.

$$a(t_i) > K * a(t_{i+1}) \quad \text{Condition 4A}$$

$$\frac{\sum_{j=0}^{m-1} a(t_{i-j})}{m} > K * \frac{\sum_{j=0}^{m-1} a(t_{i+1+j})}{m} \quad \text{Condition 4B}$$

$$(a(t_i) - a(t_{i+1})) \geq L * (A_{white} - A_{black}) \quad \text{Condition 4C}$$

The value K in Conditions 4A and 4B is, e.g., 0.80; the value L is Condition 4C is, e.g., 0.25. After resetting T_End to the $t_i$ value found with Condition 4A, 4B or 4C, the algorithm proceeds to block 39 and calculates the width of the current band using Equation 1. After storing that calculated width, the algorithm returns to block 40.

The algorithm continues alternately looping through blocks 36-37 and blocks 38-39 until T_End=T_Last. When this occurs, the algorithm proceeds to block 45 and outputs the bar code corresponding to the band widths stored in passes through blocks 37 and 39. In some cases, and as shown in FIG. 7, the path of beam 6 across the bar code may not be perpendicular to the bands. Accordingly, additional processing may be required to convert the stored band widths to values corresponding to a perpendicular beam path (such as shown in FIG. 4). This can be performed in various manners. In some embodiments, the total width of the bar code is known in advance. Using the known total width and the total of widths stored in passes through blocks 37 and 39, the actual width of each band can be trigonometrically calculated. In other embodiments, a bar code protocol allows determination of bar codes based on relative ratios of band widths. Using such a protocol, an absolute value for each width need not be determined.

In some embodiments, widths for bar code bands are calculated before scanning is complete (e.g., before all of the data is added to FIG. 5). As can be appreciated from the above description, Conditions 1A, 1B, 3A, 3B, 4A and 4B can be used to determine edges of black and white bands prior to scanning all bands of a bar code. Conditions 1C, 3C and 4C could also be used prior completely scanning a bar code if, e.g., $A_{white}$ and $A_{black}$ are calculated based on the first several white and black bands (instead of all white and black bands in the entire bar code). For example, the data being added to the table of FIG. 5 could be continuously analyzed until there are a sufficient number of amplitude values clustered around each of two central values, with those two central values becoming ($A_{black}$) and ($A_{white}$). Modification of the algorithm of FIG. 6 to calculate band widths (or relative ratios of band widths) before the entire bar code is scanned is within the routine ability of persons skilled in the art once such persons are supplied with the information provided herein.

Persons skilled in the art will, in view of the disclosures herein, recognize numerous variations on the embodiment of FIGS. 1-7. For example, other types of "stop scan" conditions can be employed. As but one type of alternate stop scan condition, a long period (e.g., 500 ms) of receiving no velocity data could be used to indicate that the scanner is stationary (and thus at the end of the scanned bar code). In some embodiments that calculate band widths prior to scanning an entire bar code, scanning is stopped once a certain number of bands (and/or a particular bar code) are recognized. Although the preceding examples describe scanning a bar code having black and white bands, bar codes employing other colors could also be scanned. As previously indicated, the algorithm of FIG. 6 assumes that the bar code being scanned starts and ends with black bands. However, this need not be the case. In other embodiments, for example, the algorithm merely assumes that scanning begins at a point prior to the starting edge of the first band (whatever color it may be) and ends at a point after the ending edge of the last band. The algorithm then works forward from the first scan point (and back from the last scan point) to find color transitions corresponding to the beginning and ending bands.

Figure 8:
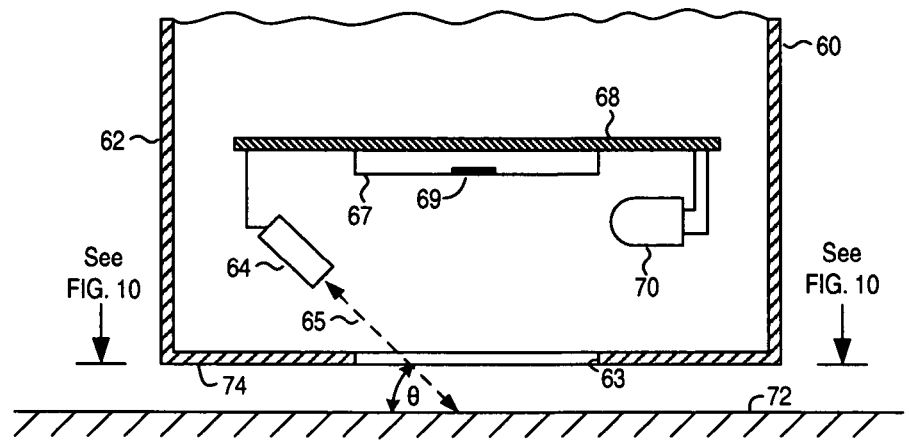
FIG. 8 is a block diagram of an imaging scanner according to at least some additional exemplary embodiments.

FIG. 8 is a block diagram of a scanner 60 according to at least some additional exemplary embodiments. Unlike scanner 1 of FIG. 1, scanner 60 is used to create a more complete image of a scanned surface. Scanner 60, which is shown in a cross-sectional view in FIG. 1, includes a housing 62 having an opening or window 63 formed therein. Window 63 forms a scanning area that is moved across a surface being imaged with scanner 60. A laser sensor 64, which is similar to laser sensor 5 of FIG. 1, is positioned within housing 62 to emit a beam 65 through window 63. Output from laser sensor 64 is provided to an IC 67 on a PCB 68. IC 67 includes image processing circuitry and an array 69 of photosensitive elements. Light generated by LED 70 is reflected into array 69 from a portion of surface 72 visible through window 63. Based on the intensity of the light received by individual photoreceptors in the array, image processing circuitry in IC 67 generates an image of a small portion (or frame) of surface 72. Although FIG. 8 shows a separation between an underside 74 of scanner 60 and surface 72, underside 74 would (in at least some embodiments) rest flatly upon surface 72 during scanning. In this manner, and based on the positioning of sensor 64 within housing 62, beam 65 is directed onto surface 72 at a known angle θ. For simplicity, lenses, light guides and various other components are not shown in FIG. 8.

Figure 9:
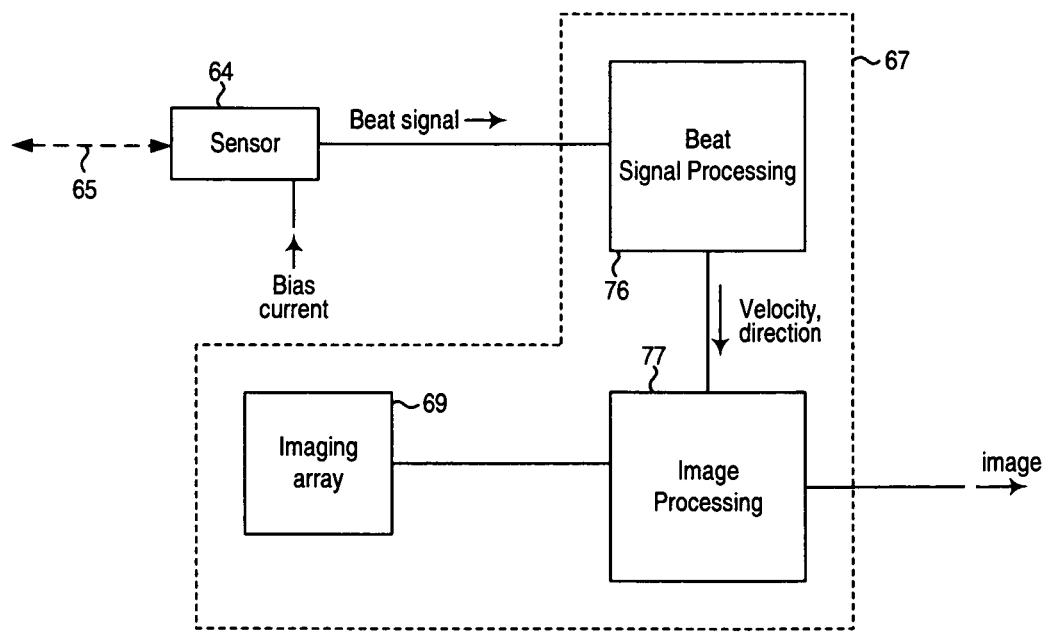
FIG. 9 is a block diagram showing components of the imaging scanner of FIG. 8.

FIG. 9 is a block diagram of laser sensor 64 and imaging IC 67. As with sensor 5 of FIGS. 1 and 3, sensor 64 outputs a beat signal. That beat signal is processed by beat signal processing circuitry 76 that is similar to beat signal processing circuitry 13 in FIG. 3. In at least some embodiments, beat signal processing circuitry 76, array 69 and image processing circuitry 77 are contained in imaging IC 67. Imaging circuits per se are known in the art, and thus are not described in detail herein. Unlike conventional imaging circuits, however, image processing circuitry 77 also receives data from beat signal processing circuitry 76 that indicates a velocity and direction in which array 69 moves as multiple image frames are generated. As explained below, this velocity information is then used to correctly position individual frames relative to one another so as to create an image of a larger area.

Figure 10:
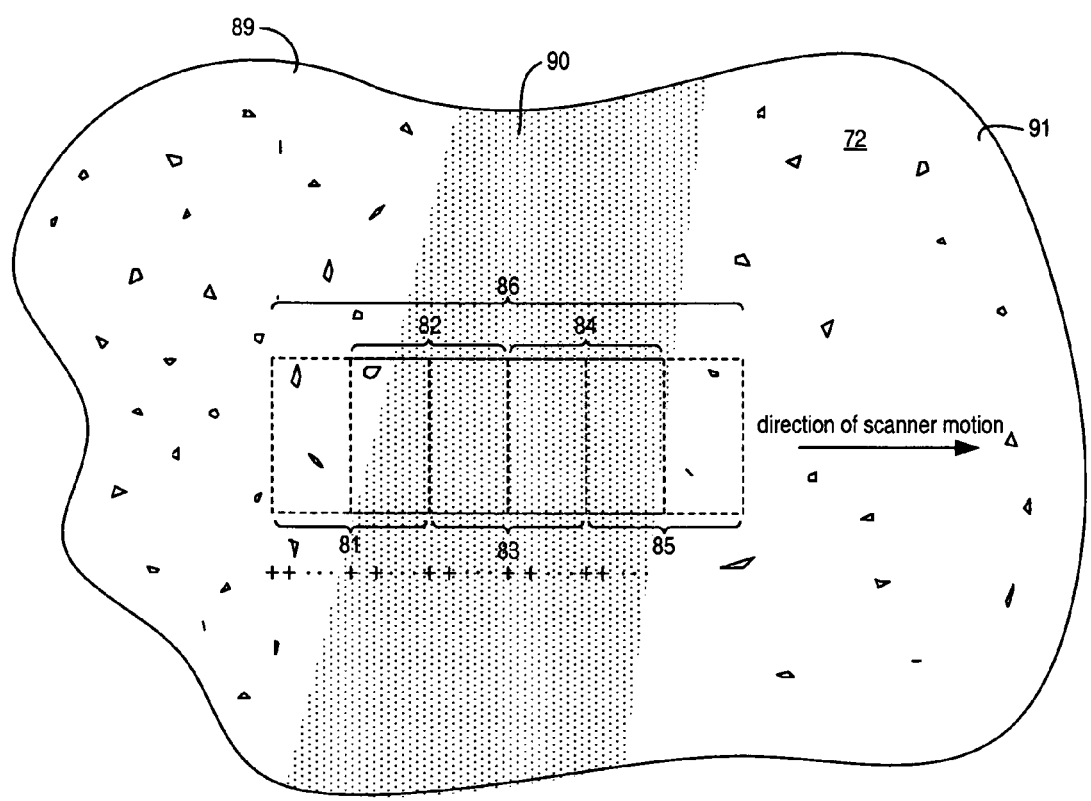
FIG. 10 shows a portion of a surface over which the scanner of FIG. 9 is moved to create an image.

FIG. 10 shows a portion of surface 72 over which scanner 60 is moved to create an image. Individual frames of image data 81-85, which correspond to the locations shown in FIG. 10, are successively generated as array 69 is moved over those locations. These frames are later combined to form an image of a larger portion 86 of surface 72. In the example of FIGS.

10-12E, surface 72 includes regions 89, 90 and 91. Regions 89 and 91 include numerous minute surface features (shown as arbitrarily shaped and distributed polygons) which can be detected within an image frame. Regions 89 and 91 may, for example, be unprinted regions on a piece of paper. Region 90 is substantially darker than regions 89 and 91. Region 90 may have substantially fewer surface features, or may be so dark that surface features are difficult to discern within an image frame. Region 90 may, for example, be a highly glossy region or a large region of black ink. In other words, region 90 is distinguishable from regions 89 and 91, but individual frame-sized areas within region 90 are generally not distinguishable from other individual frame-sized areas within region 90.

Figure 11A:
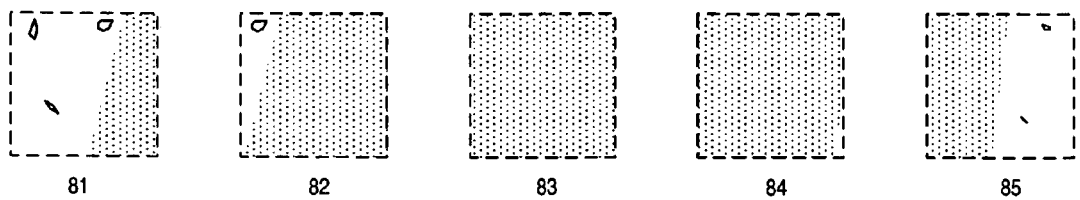
FIGS. 11A-11D illustrate a potential problem posed by prior art imaging techniques.
Figure 11B:
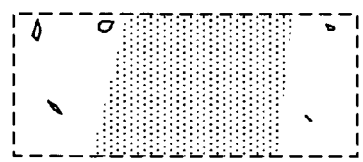
Figure 11C:
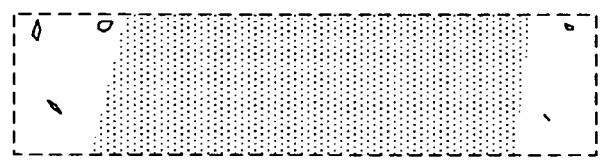
Figure 11D:
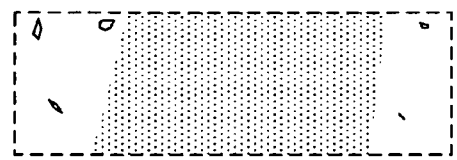

FIGS. 11A-11D illustrate a potential problem when imaging surfaces such as region 90. In order to properly combine multiple frames into a larger image, it is necessary to determine the proper displacement between frames. The speed of an array across the imaged surface may not be constant, and thus the inter-frame displacement may vary. Some prior art techniques determine the proper relative displacement by comparing adjacent frames and correlating surface features in overlapping portions of the compared frames. When surface features in a frame are difficult to detect, however, determining the proper amount of frame overlap is also difficult. FIG. 11A shows frames 81-85 of FIG. 10. Frames 81, 82, 84 and 85 contain surface features and region boundaries which can be used to properly align frames 81 and 82 and frames 84 and 85. However, frame 83 and large portions of frames 82 and 84 correspond to areas in region 90. Because surface features are difficult to detect within region 90, determining the proper overlap between frames is also difficult. Without knowing the proper overlap, frames 81-85 could potentially correspond to an actual area on an imaged surface such as shown in FIG. 11B (where the region 90 portions of frames 82-84 are overlapped to the maximum extent possible), to an area such as shown in FIG. 11C (where the region 90 portions have the least possible overlap), or to something in between. For convenience, FIG. 11D shows frames 81-85 with the proper amount of overlap.

Figure 12A:
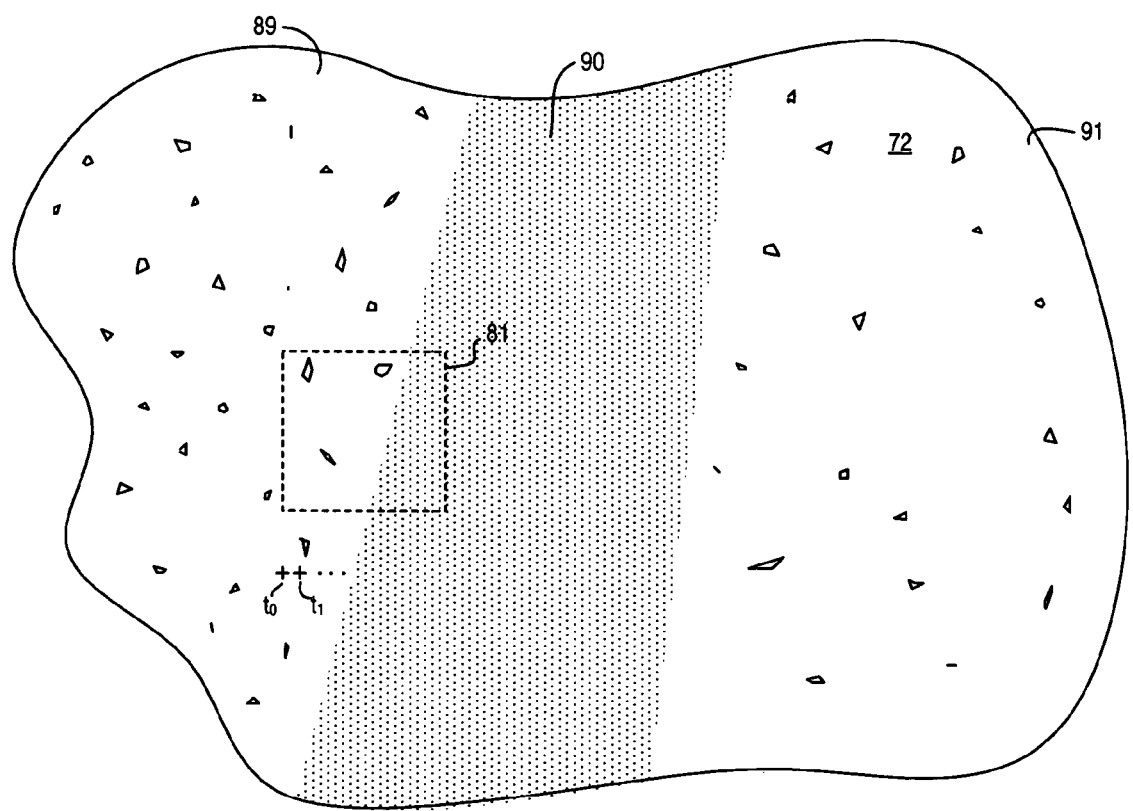
FIGS. 12A-12E show a series of imaging frames and velocity measurements.
Figure 12B:
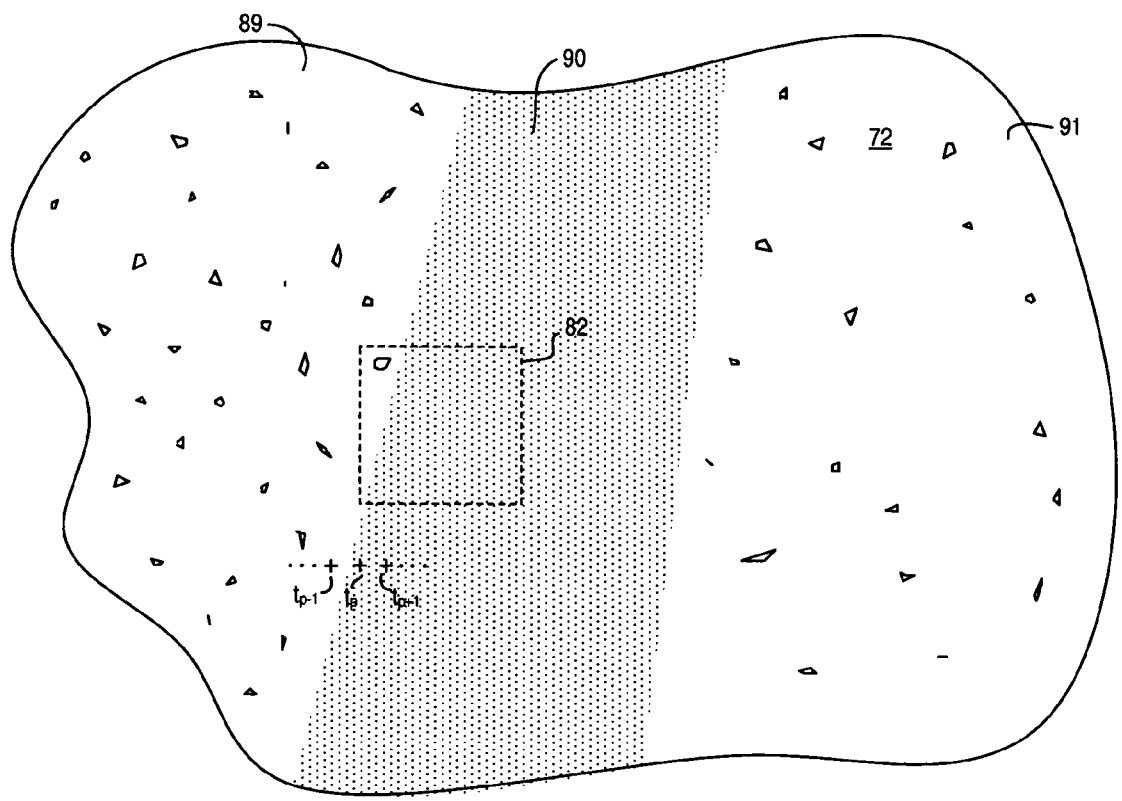
Figure 12C:
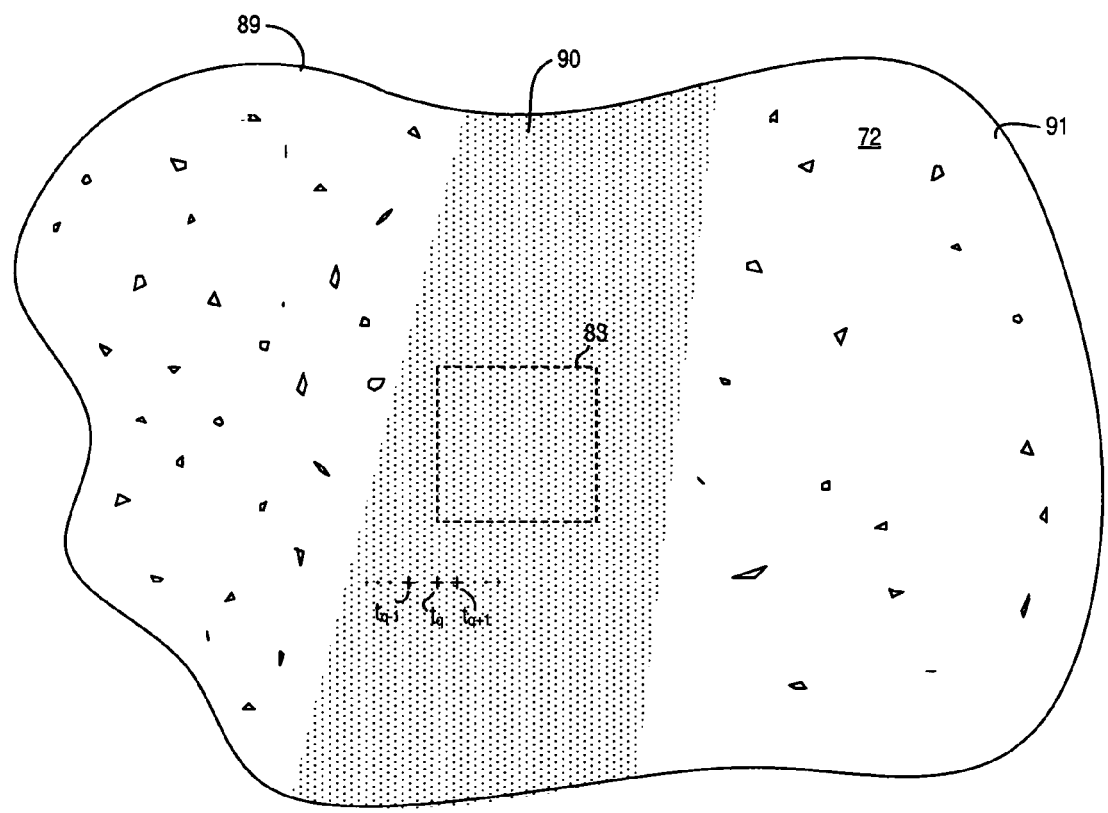
Figure 12D:
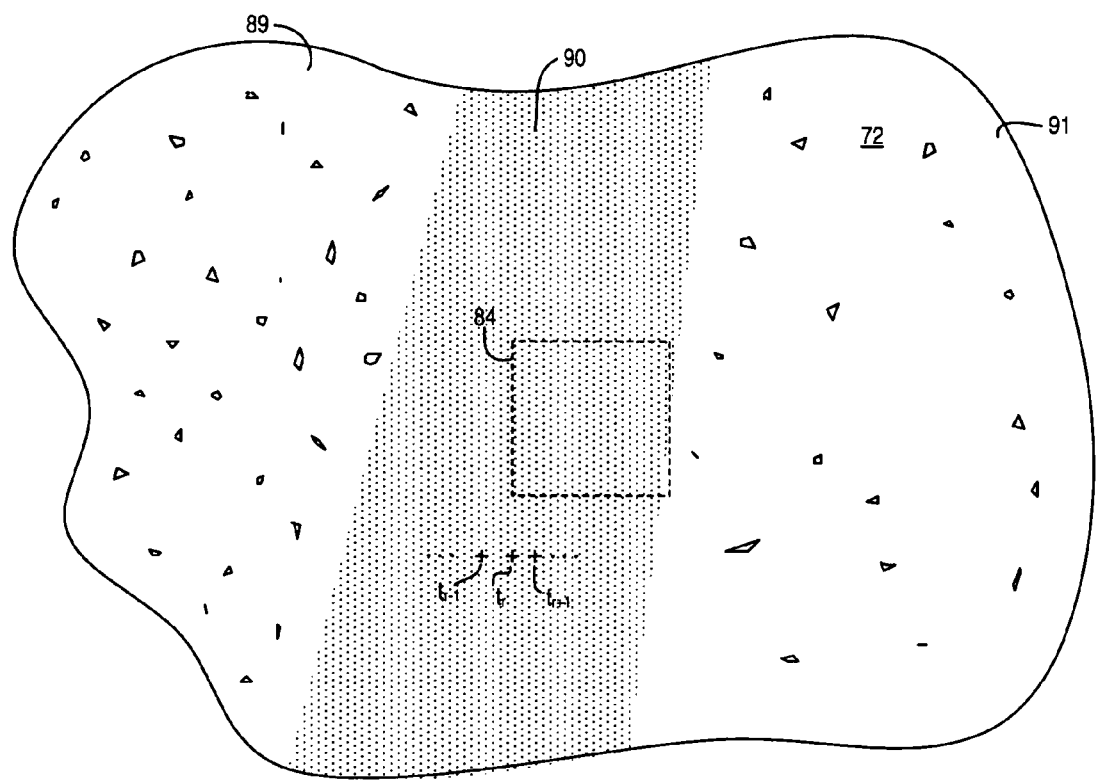
Figure 12E:
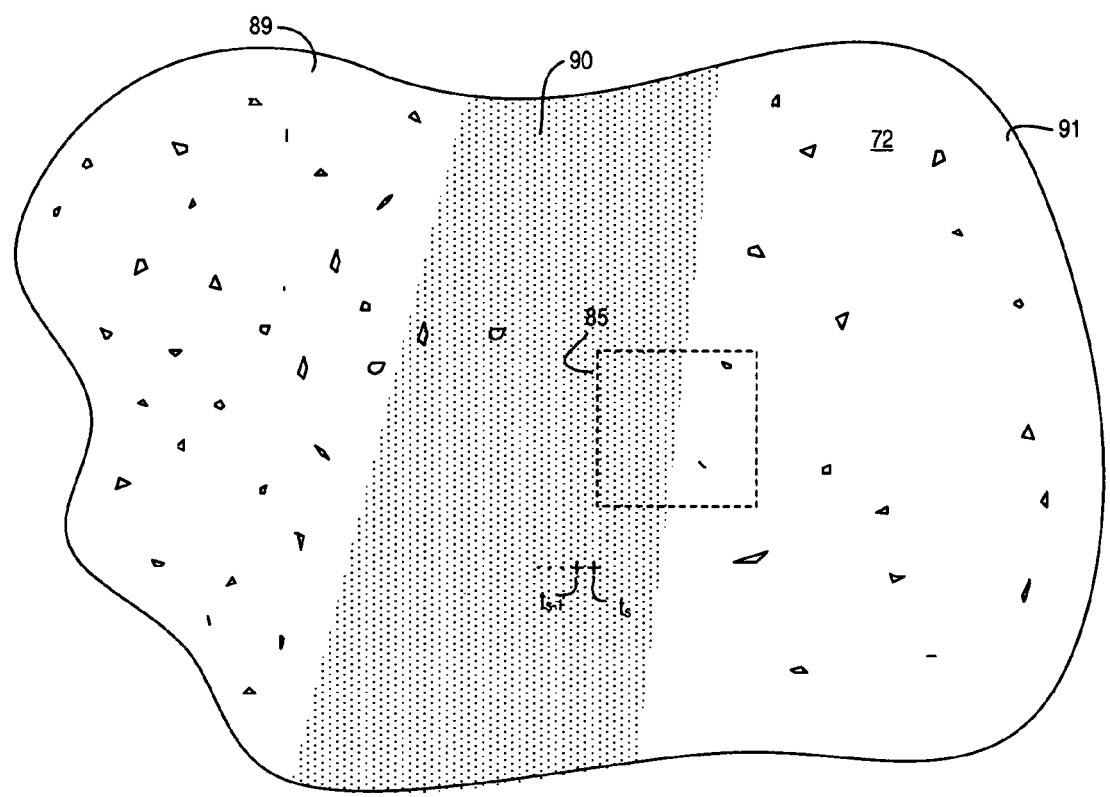

In at least some embodiments, frame displacements are determined through velocity data generated in addition to the image frame data. This velocity data is generated using laser sensor such as sensor 64 of FIGS. 8 and 9. As seen in FIG. 10, plus signs ("+") represent locations at which beam 65 strikes surface 72 during each of multiple velocity measurements. FIGS. 12A-12E show imaging and velocity measurement in more detail. In FIG. 12A, imaging begins with frame 81. When image frame 81 is created at time index $t_0$, a first velocity measurement is taken. Subsequent velocity measurements are taken at time index $t_1$ and thereafter (shown with an ellipsis). In FIG. 12B, a second frame (82) is generated at time index $t_p$. Additional velocity measurements are taken at time index $t_{p+1}$ and thereafter. A similar pattern continues in FIG. 12C (frame 83 is generated at time $t_q$), FIG. 12D (frame 84 at time $t_r$) and FIG. 12E (frame 85 at time $t_s$). Data for the velocity measurements, their corresponding time indices, and frame identifiers are stored in a table or other data structure. FIG. 13 is a table illustrating one manner in which that data may be stored. As in the table of FIG. 5, a value "t_" (where "_" is 0, 1, p–1, etc.) is a time index for a particular velocity sampling. A value "v(t_)" is a velocity at time index t_. Velocity values are given a positive sign to indicate that scanner 60 is moving in one direction relative to a scanned surface, and a negative sign to indicate movement in an opposite direction. For purposes of explanation, common frame identifiers 81-85 are used in FIGS. 10 and 12A-13.

Figure 14:
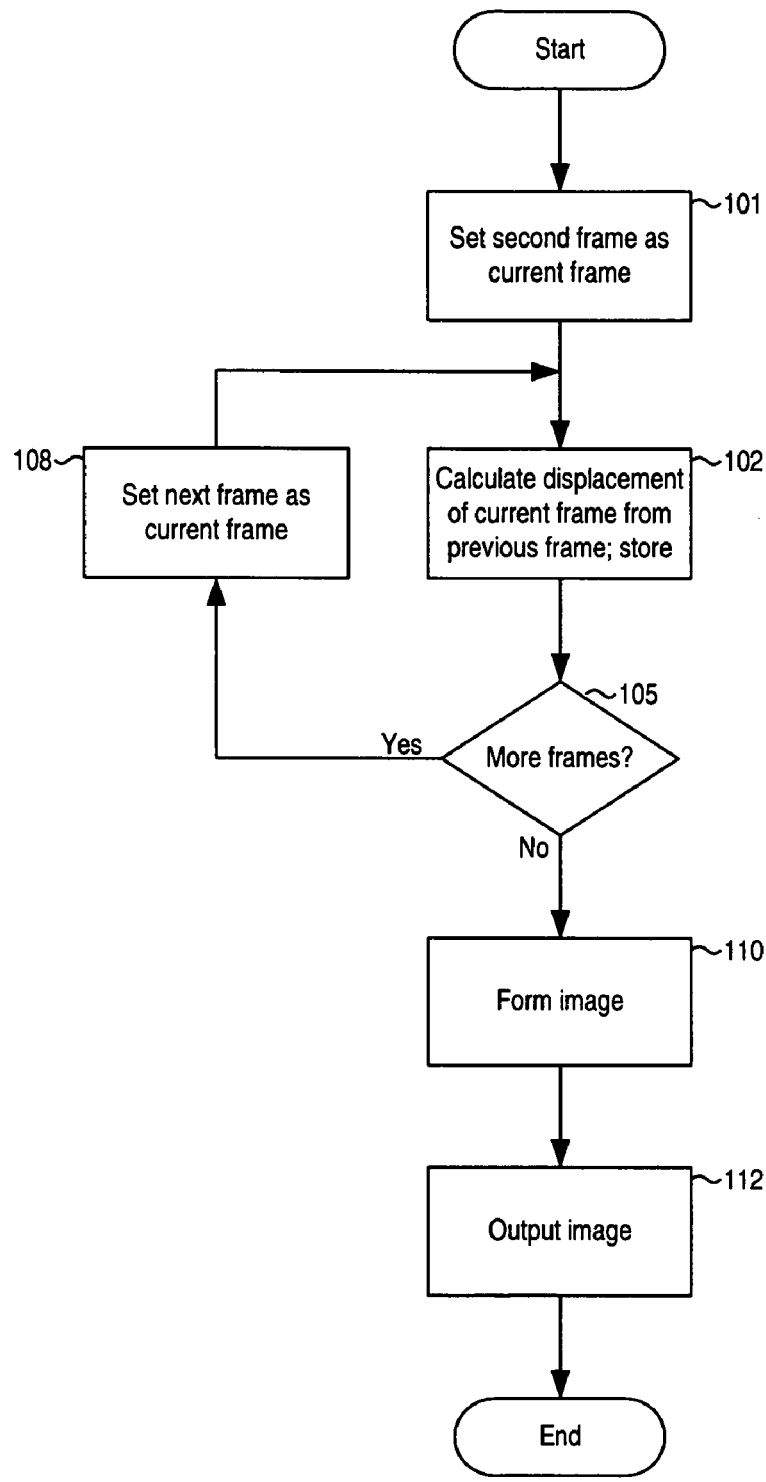
FIG. 14 is a flow chart showing one algorithm for determining relative frame displacements using data such as that in FIG. 13.

Using the data in FIG. 13, the proper position of each frame relative to a preceding and/or following frame can be determined. FIG. 14 is a flow chart showing one algorithm, implemented by programming instructions within image processing circuitry 77, for determining one-dimensional relative frame displacements using data such as that in FIG. 13. After commencing, the algorithm proceeds to block 101 and selects the second frame in the table as the current frame. In the present example, frame 82 is selected. The algorithm then proceeds to block 102. In block 102, the displacement between the current frame and the previous frame (frame 81) is determined by integrating over time the velocity data for the sampling intervals between the current and previous frame. In some embodiments, the displacement is determined using Equation 2.

$$D(n) = \sum_{j=t_{prev}+1}^{t_{current}} \frac{(t_j - t_{j-1}) * (v_j + v_{j-1})}{2} \quad \text{Equation 2}$$

In Equation 2, D(n) is the displacement of frame n from the position of the previous frame. The time $t_{prev}+1$ is the time index for the second velocity sampling after the generation of the previous frame. In the present example, $t_{prev}+1$ is $t_1$. The time $t_{current}$ is the time index for the velocity measurement coinciding with generation of the current frame. In the present example, $t_{current}$ is $t_p$. As can be appreciated, any reversal of scan direction would result in a negative velocity value. Negative velocity values would, in turn, cause incremental reductions in a displacement being calculated.

After storing the displacement for the current frame, the algorithm proceeds to block 105. In block 105, the algorithm determines whether there are additional frames. If so, the algorithm proceed on the "yes" branch to block 108. In block 108, the algorithm selects the next frame (frame 83 in the present example). The algorithm then proceeds to block 102 and calculates the displacement between the current frame (now frame 83 in the present example) and the previous frame (frame 82). After storing this displacement, the algorithm again proceeds to block 105 and determines if there are additional frames. The loop of blocks 102 through 108 is repeated until all displacements are calculated for all frames identified in the table of FIG. 13.

When a determination is made in block 105 that there are no more frames for which displacement must be determined, the algorithm proceeds on the "no" branch to block 110. In block 110, an image is formed by combining all of the frames with the proper overlap. Depending on the type of image processing algorithm used, this may involve deleting a portion of one frame which is overlapped by another frame. In other algorithms, the overlapping portions may be averaged or combined in some other manner. From block 110, the algorithm proceeds to block 112 and outputs the combined-frame image.

Figure 15:
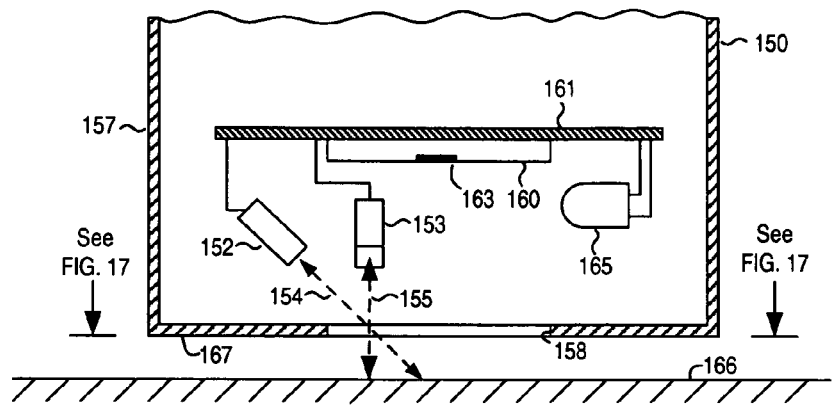
FIG. 15 is a cross-sectional diagram of an imaging scanner according to another embodiment.

The algorithm of FIG. 14 assumes one-dimensional movement of the array relative to the imaged surface. In other embodiments, motion in two dimensions is determined. FIG. 15 is a cross-sectional diagram of a scanner 150 according to at least one such embodiment. Scanner 150 is similar to scanner 60 of FIG. 8, but includes two laser sensors 152 and 153. As with scanner 60 of FIG. 8, scanner 150 includes a housing 157 having a window 158 formed therein. Laser sensors 152 and 153 are positioned within housing 157 to emit beams 154 and 155 through window 158. Output from sensors 152 and 153 is provided to an IC 160 on a PCB 161.

IC 160 includes image processing circuitry and an array 163 of photosensitive elements, and creates image frames based on light (generated by LED 165) that is reflected from a portion of surface 166 visible to array 163 through window 158. As with scanner 60, underside 167 would (in at least some embodiments) rest flatly upon surface 166 during scanning. In this manner, and based on the positioning of sensors 152 and 153 within housing 157, beams 154 and 155 are directed onto surface 166 at known angles.

Figure 16:
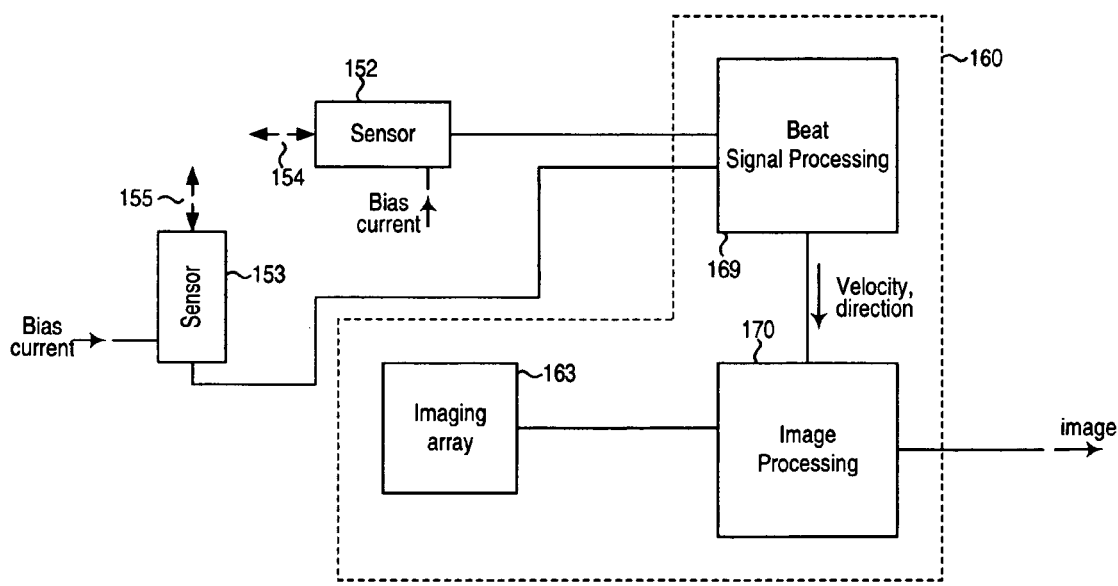
FIG. 16 is a block diagram showing components of the imaging scanner of FIG. 15.

FIG. 16 is a block diagram of laser sensors 152 and 153, together with IC 160. Sensors 152 and 153 are similar to sensor 64 in FIG. 8, and output a beat signal which can be used to determine motion of the sensors relative to a scanned surface. Beat signal processing circuitry 169 is similar to beat signal processing circuitry 76 in FIG. 9, but is configured to provide velocity and direction data corresponding to each of sensors 152 and 153. Image processing circuitry 170 is similar to image processing circuitry 77, but is further configured to calculate translational displacements of image frames in two dimensions.

Figures 17, 18:
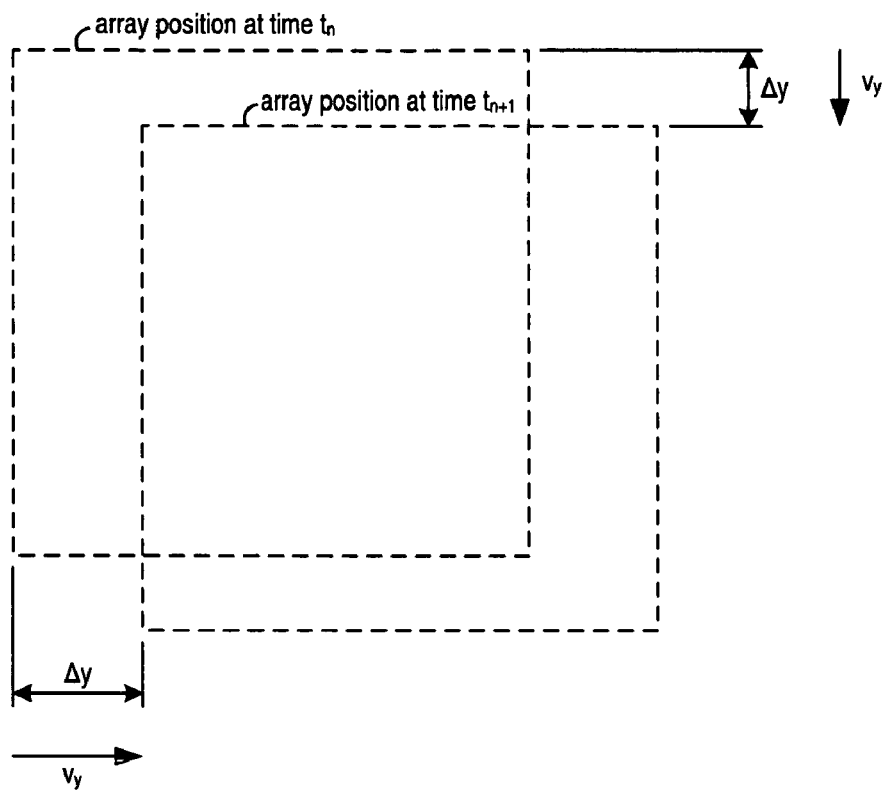
FIG. 17 is a diagram showing x and y displacements of an array over an imaged surface.
FIG. 18 is a table illustrating one manner in which data may be stored when scanning an image according to at least some embodiments.

FIG. 17 is a diagram, from the viewpoint indicated in FIG. 15, showing the positioning of array 163 over surface 166 at times $t_n$ and $t_{n+1}$. Because each of sensors 152 and 153 will each only measure the component of velocity that is parallel to the projection of its VCSEL beam path onto scanned surface 166, only the $v_x$ and $v_y$ velocities are measured. These velocities can be used, in a manner similar to that previously described, to calculate $\Delta x$ and $\Delta y$ movements. Based on values for $v_x$ and $v_Y$ stored at multiple times during and between imaging frames (as shown in the table of FIG. 18), x and y displacements of one image frame relative to a previous (or succeeding image frame) can be calculated.

Figure 19:
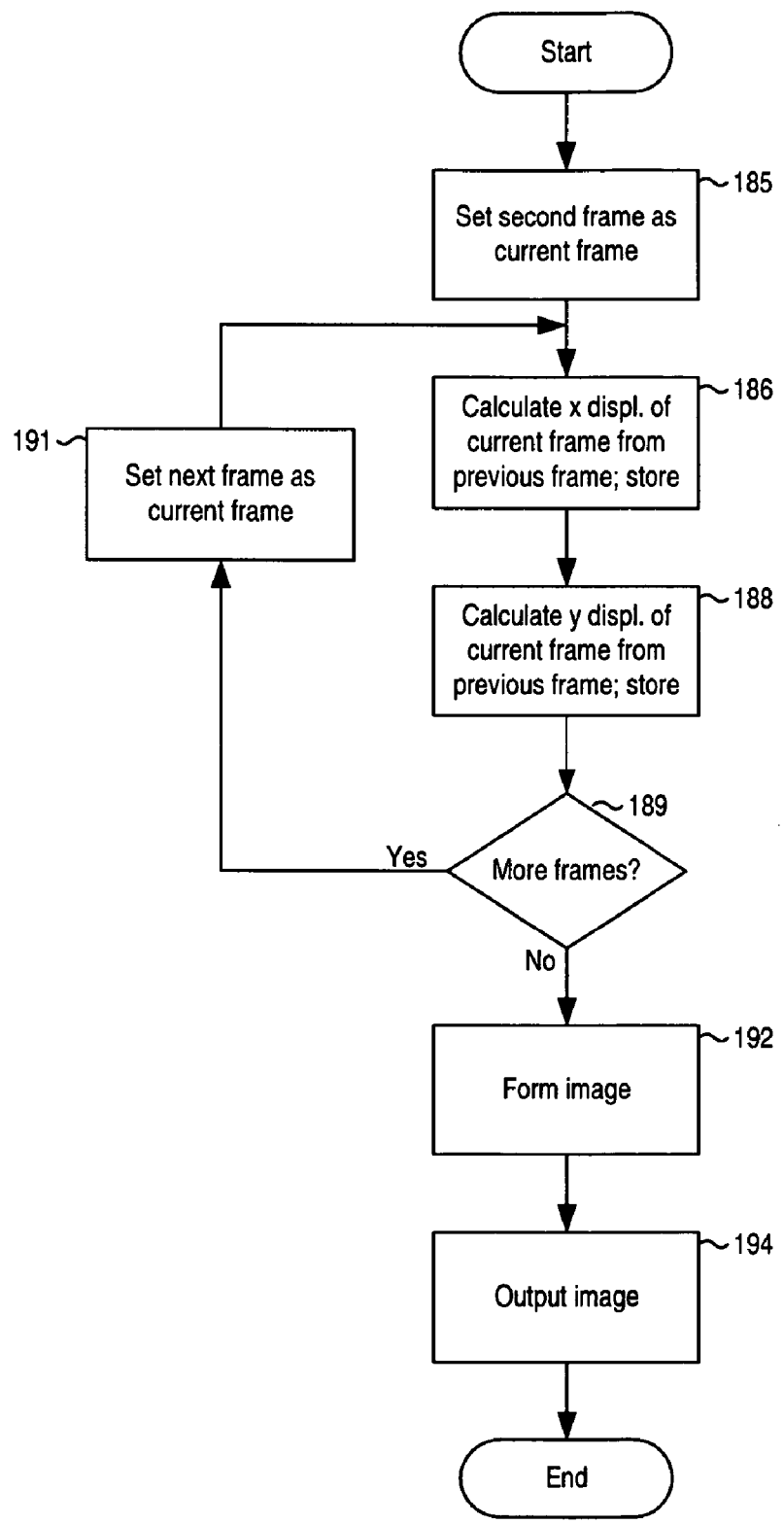
FIG. 19 is a flow chart showing one algorithm for determining relative frame displacements using data such as that in FIG. 18.

FIG. 19 is a flow chart showing one algorithm, implemented by programming instructions within image processing circuitry 170, for determining frame translation in x and y directions using data such as that in FIG. 18. After commencing, the algorithm proceeds to block 185 and selects the second frame in the table as the current frame. The algorithm then proceeds to block 186 and determines the x direction displacement of the current frame relative to the previous frame. This determination is made in a manner similar to that previously described in connection with FIG. 14, but using the x velocity values from FIG. 18. The algorithm then proceeds to block 188 and calculates the y direction displacement of the current frame relative to the previous frame. This determination is also made in a manner similar to that previously described in connection with FIG. 14, but using the y velocity values from FIG. 18. In block 189, the algorithm determines whether there are additional frames. If so, the algorithm proceed on the "yes" branch to block 191. In block 191, the algorithm selects the next frame. The algorithm then returns to block 186. The loop of blocks 186 through 191 is repeated until x and y displacements are calculated for all frames identified in the table of FIG. 18.

When a determination is made in block 189 that there are no more frames for which displacement must be determined, the algorithm proceeds on the "no" branch to block 192. In block 192, an image is formed by combining all of the frames with the proper overlap. Depending on the type of image processing algorithm used, this may involve deleting a portion of one frame which is overlapped by another frame. In other algorithms, the overlapping portions may be averaged or combined in some other manner. From block 192, the algorithm proceeds to block 194 and outputs the combined-frame image.

In some embodiments, another pair of laser sensors is added and used to determine rotational movement of a frame relative to a previous frame. The second pair of sensors is located a distance away from the first pair of sensors. If, for example, the second pair of sensors measures velocity of the same magnitude as that measured by the first pair, but in an opposite direction, there is rotational movement of the frame about a center defined by a middle point between the two sensor pairs.

In addition to overcoming disadvantages of prior art scanning techniques described in connection with FIGS. 11A-11D, the embodiments of FIGS. 8-10 and 12A-19 offer other improvements over the prior art. For example, less overlap between adjacent frames is necessary. Because calculation of frame displacement is not based upon correlation of features within overlapping frame regions, less overlap is needed. In other words, the frames only need overlap by an amount that is sufficient to avoid gaps between frames in a resulting image. The amount of overlap necessary to avoid such gaps is substantially less than the amount of overlap needed for movement-determining correlation. Because less overlap is needed, the frame rate can be reduced.

Figure 20A:
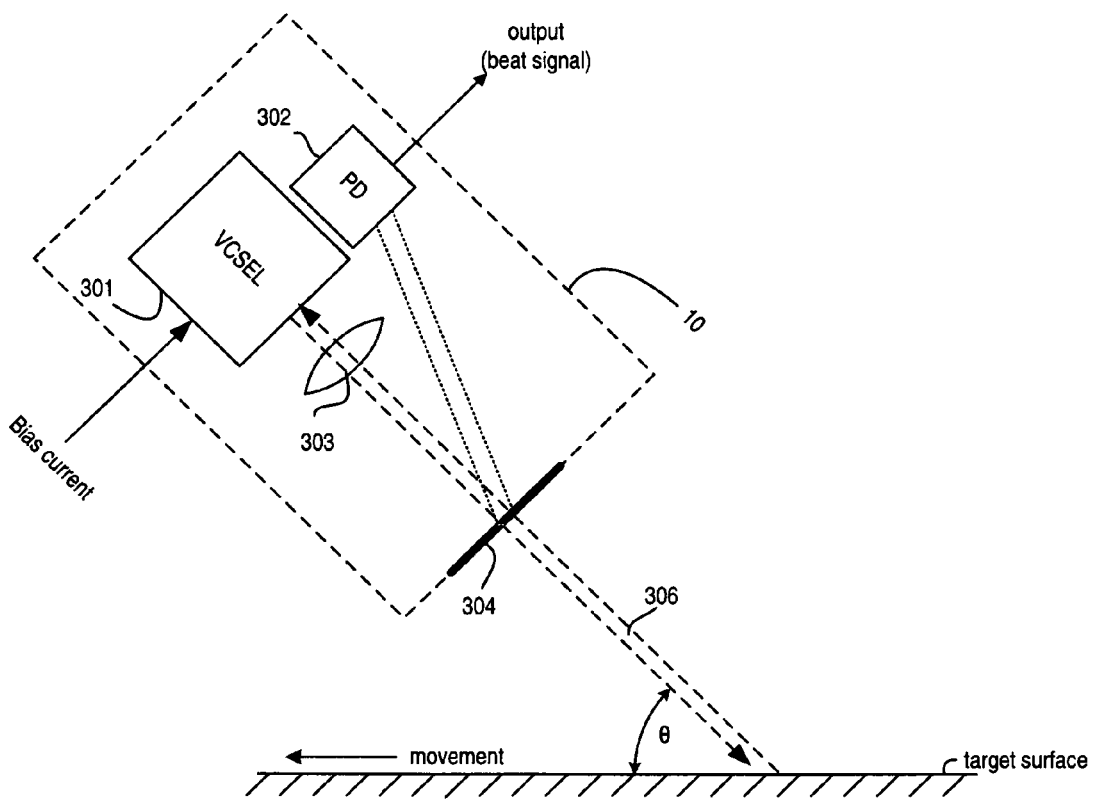
FIG. 20A is a block diagram of a sensor such as is shown in FIGS. 1, 3, 8, 9, 15 and 16.
Figure 20A:
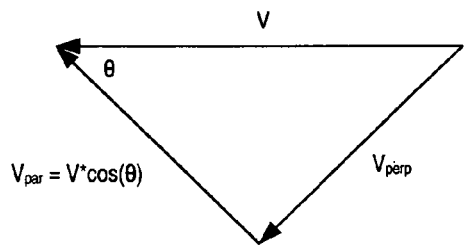

FIG. 20A is a block diagram of laser sensor 300 which could be used as any of sensors 5, 64, 152 or 153 of the above-described embodiments. Included in sensor 300 is a vertical cavity surface emitting laser (VCSEL) 301, a photo-sensitive detector 302, a lens 303 and a partially reflective surface 304. VCSEL 301 receives power in the form of a biasing current. Laser light emanating from the emitting cavity of VCSEL 301 passes through lens 303 and surface 304 to exit sensor 300 as beam 306. A portion of beam 306 is then backscattered back into VCSEL 301, as discussed more fully below. Surface 304 is partially reflective, and thus directs a small portion of the laser beam (approximately 5%) to PD 302. The output of PD 302 varies based on the intensity of light reflected from surface 304. Accordingly, output of PD 302 can also be used to measure the power output of beam 306. PD 302 can be a photodiode, a phototransistor or other type of device which varies its output based on the intensity of received light.

Figure 20B:
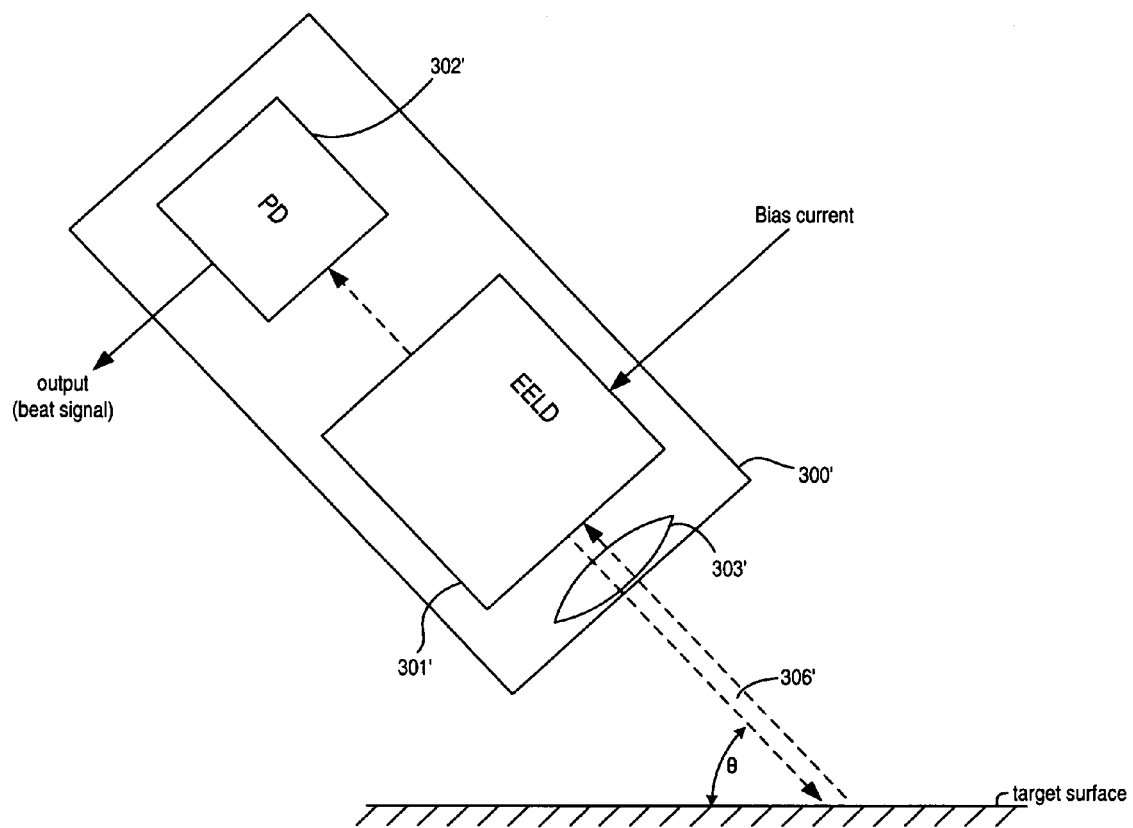
FIG. 20B is a block diagram of an alternate embodiment of a sensor.

FIG. 20B is a block diagram of a sensor 300' according to at least some alternate embodiments. Unlike sensor 300, which employs a VCSEL, sensor 300' employs an edge emitting laser diode (EELD) 301'. Unlike a VCSEL, which emits laser from the top, an EELD emits from two sides. Accordingly, laser light from one edge of EELD 301' passes through lens 303' and out of sensor 300' as beam 306'. Light emanating from the other edge of EELD 301' strikes PD 302'; the PD 302' output is thus usable to measure power output in beam 306'. For simplicity, the remainder of this description will refer to sensor 300 of FIG. 20A. It is to be appreciated, however, that sensor 300', EELD 301', PD 302' and beam 306' could respectively be substituted for sensor 300, VCSEL 301, PD 302 and beam 306 in the following description.

Returning to FIG. 20A, backscattered light from beam 306 strikes the target surface and returns to VCSEL 301. This backscattered light enters the emitting cavity of VCSEL 301 and mixes with the light being generated. Because of the self-mixing effect, the power output by VCSEL 301 in beam 306 is affected. Moreover, and as can be seen in FIG. 20A, the target surface is moving with respect to VCSEL 301 at speed V. Beam 306 strikes the target surface at an angle $\theta$ which is between zero and ninety degrees. The motion of the target surface includes a component perpendicular to beam 306 ($V_{perp}$) and a component parallel to beam 306 ($V_{par}$). The $V_{par}$ component is equal to $V*\cos(\theta)$. In the example of FIG. 20A, the target surface is therefore moving toward VCSEL 301 at a velocity of $V*\cos(\theta)$. If the target surface were moving at the same speed but in the opposite direction, the component of that motion parallel to beam 306 would thus be moving away from sensor 300 at a velocity of $-V*\cos(\theta)$.

Because the target surface is moving in relation to VCSEL 301, self-mixing will cause the power output of VCSEL 301 to fluctuate in a periodic manner. These periodic fluctuations, or "beats," can be detected by monitoring output from PD 302. The output of PD 302, or "beat signal," will have a frequency which varies based on the speed with which the target surface is moving relative to VCSEL 301. Moreover, the beat signal frequency will equal the Doppler frequency shift ($F_D$) in the light being backscattered from the target surface. The Doppler frequency $F_D$ is related to the velocity of the target surface as set forth in Equation 3.

$$F_D = \frac{V*\cos(\theta)}{(\lambda/2)}, \quad \text{Equation 3}$$

where $\lambda$ is the wavelength of light emitted by VCSEL 301.

As can be appreciated from the foregoing description and from FIG. 20A, "V" in Equation 3 will be positive for one direction and negative for the opposite direction. Because the Doppler frequency $F_D$ is actually a measure of a frequency shift, $F_D$ will also have a sign corresponding to that of V. However, the frequency of the measured beat signal will not be signed. Although the measured beat frequency can be used with Equation 3 to determine the magnitude (i.e., absolute value) of the linear speed V, something more is needed to determine direction of motion.

Figure 21A:
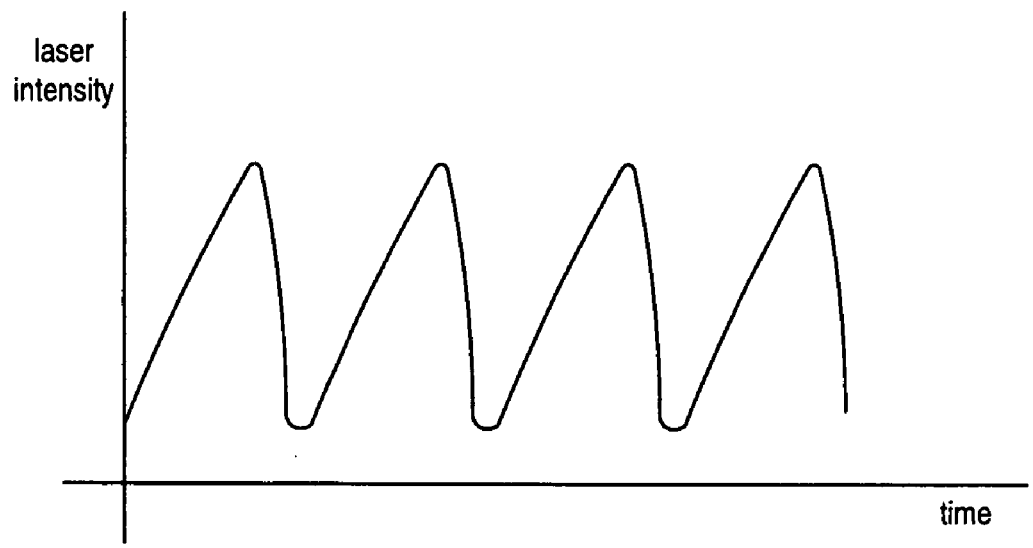
FIGS. 21A and 21B illustrate asymmetry of a self-mixing waveform under certain conditions.
Figure 21B:
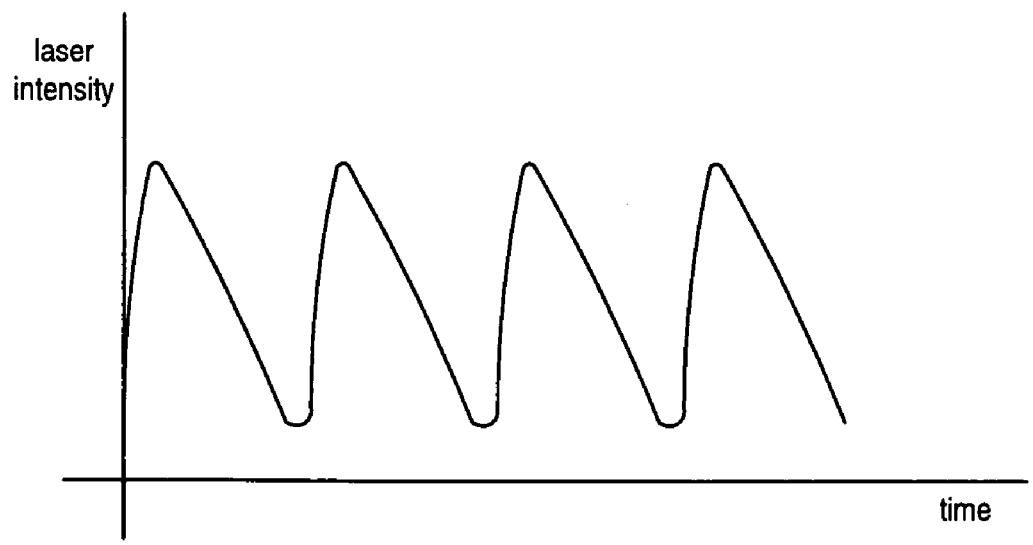

However, other aspects of the beat signal from PD 302 can be employed to determine the direction in which the target surface is moving relative to VCSEL 301. Under conditions which will often be controllable, the beat signal waveform is asymmetric. As described, e.g., in Wang et al., Self-Mixing Interference Inside a Single-Mode Diode Laser for Optical Sensing Applications," Journal of Lightwave Technology, Vol. 12, No. 9 (IEEE, September 1994), this waveform will approximate a sawtooth wave under certain circumstances. The orientation of the "teeth" in this wave will correspond to the direction in which a target surface is moving relative to VCSEL 301, as shown in FIGS. 21A and 21B. In FIG. 21A, a surface is moving in one direction relative to a laser and at a constant speed. In FIG. 21B, the surface is moving in the opposite direction at the same speed.

In another approach, direction of motion may be determined using triangular current modulation. In particular, the biasing current of VCSEL 301 is periodically ramped up and down such that a waveform corresponding to the biasing current resembles a series of triangles. As the biasing current increases, the frequency of the light from VCSEL 18 also decreases slightly. Conversely, the frequency of light from VCSEL 18 increases slightly as the biasing current decreases. This causes different Doppler frequency shifts for a given relative movement of the target surface. In other words, for movement of the target surface at a constant velocity, $F_D$ will vary with the biasing current. Using signal processing techniques known to persons skilled in the art, differences between $F_D$ values on the bias current upslope and on the bias current downslope are compared so as to indicate the direction of motion.

Figure 22:
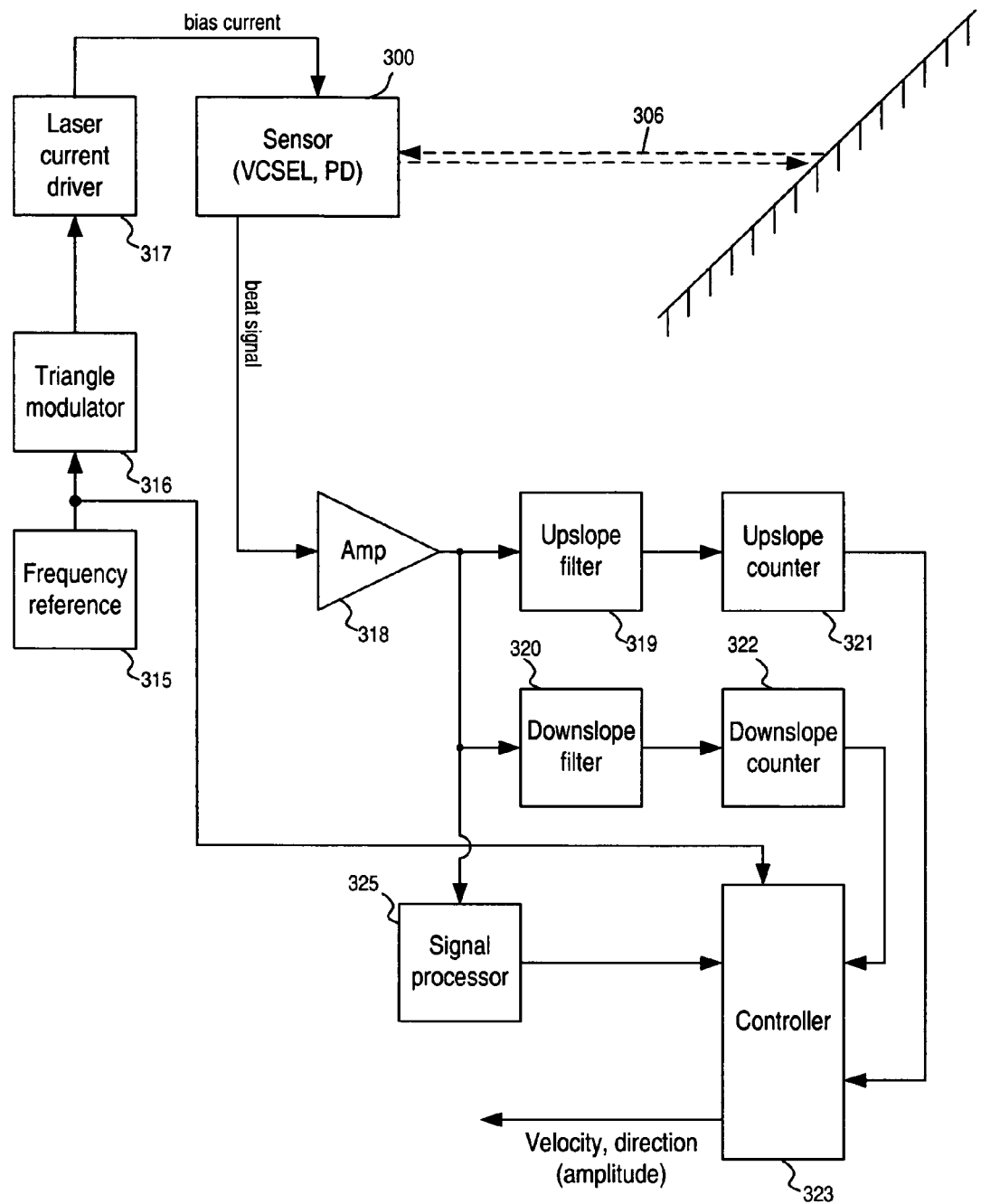
FIG. 22 is a block diagram of at least one illustrative embodiment of processing circuitry for determining the speed and direction of a moving surface.

FIG. 22 is a block diagram of one example of beat signal processing circuitry that can be employed in the embodiments of FIGS. 3, 9 and 16. Sensor 300 is substantially identical to sensor 300 of FIG. 20A, and includes a VCSEL and PD. Based on a frequency input by frequency reference 315, modulator 316 modulates biasing current driver 317 with a triangle wave. Current driver 317 provides the triangularly modulated bias current to the VCSEL of sensor 300. As a result, beam 306 shines onto the target surface at a frequency which rises and falls based on that triangular modulation. A portion of the light from beam 306 backscattered from the target surface is received by the VCSEL of sensor 300. The output of the VCSEL is measured by the PD of sensor 300, which in turn outputs the beat signal. The beat signal is amplified by amplifier 318 and then provided to upslope filter 319 and downslope filter 320. Upslope filter 319 extracts the portion of the amplified beat signal corresponding to the bias current upslope, while downslope filter 320 extracts the portion of the amplified beat signal corresponding to the bias current downslope. The frequencies for the filtered up- and downslope portions are then counted in frequency counters 321 and 322 and provided to control unit 323 (e.g., a microprocessor). Control unit 323 receives an indication of whether the bias current is on an upslope or downslope from frequency reference 315, and calculates the frequency difference between the upslope and downslope Doppler shifts to determine the direction in which the target surface is moving. Control unit 323 also uses an average of the upslope and downslope Doppler shifts to determine the speed with which the target surface is moving toward or away from the VCSEL.

When used with the embodiment of FIGS. 1 and 3, the signal from amplifier 318 is also processed in signal processor 325 to provide a signal indicative of the amplitude of the beat signal. This processing can be performed in various manners known in the art, the selection of which will depend on the measure used for beat signal amplitude (e.g., RMS voltage, peak-to-peak voltage). The amplitude information output from signal processor 325 is provided to controller 323 for forwarding with velocity and direction information.

Under some conditions, the beat signal processing circuitry of FIG. 22 may be subject to certain limitations. One possible limitation relates to the characteristics of the target surface. The signal to noise ratio of PD 302 output can be very poor if, e.g., the surface reflectivity is also poor (e.g., an absorbing or transmissive surface for a particular light wavelength). Very low values for velocity of the target surface may also present problems. As indicated above, the frequency of the beat signal is equal to the Doppler shift $F_D$. As the measured velocity gets smaller, the beat signal frequency will also decrease. When the velocity becomes sufficiently small, there may not be sufficient cycles in a given sampling window for PD 302 output, and velocity may become indeterminate. When velocity (and thus beat signal frequency) is below a certain level, there is a higher probability that noise in the beat signal can result in false velocity determinations. The range of frequency response for the circuit of FIG. 22 may also be limited. A Doppler signal in a laser self-mixing velocimeter can also suffer from interfering amplitude modulation and broad frequency spreading. For these reasons, it can be difficult (at least with conventional approaches) to accurately detect frequency or to expand the velocity measurement dynamic range or the movement direction discrimination dynamic range.

Figure 23A:
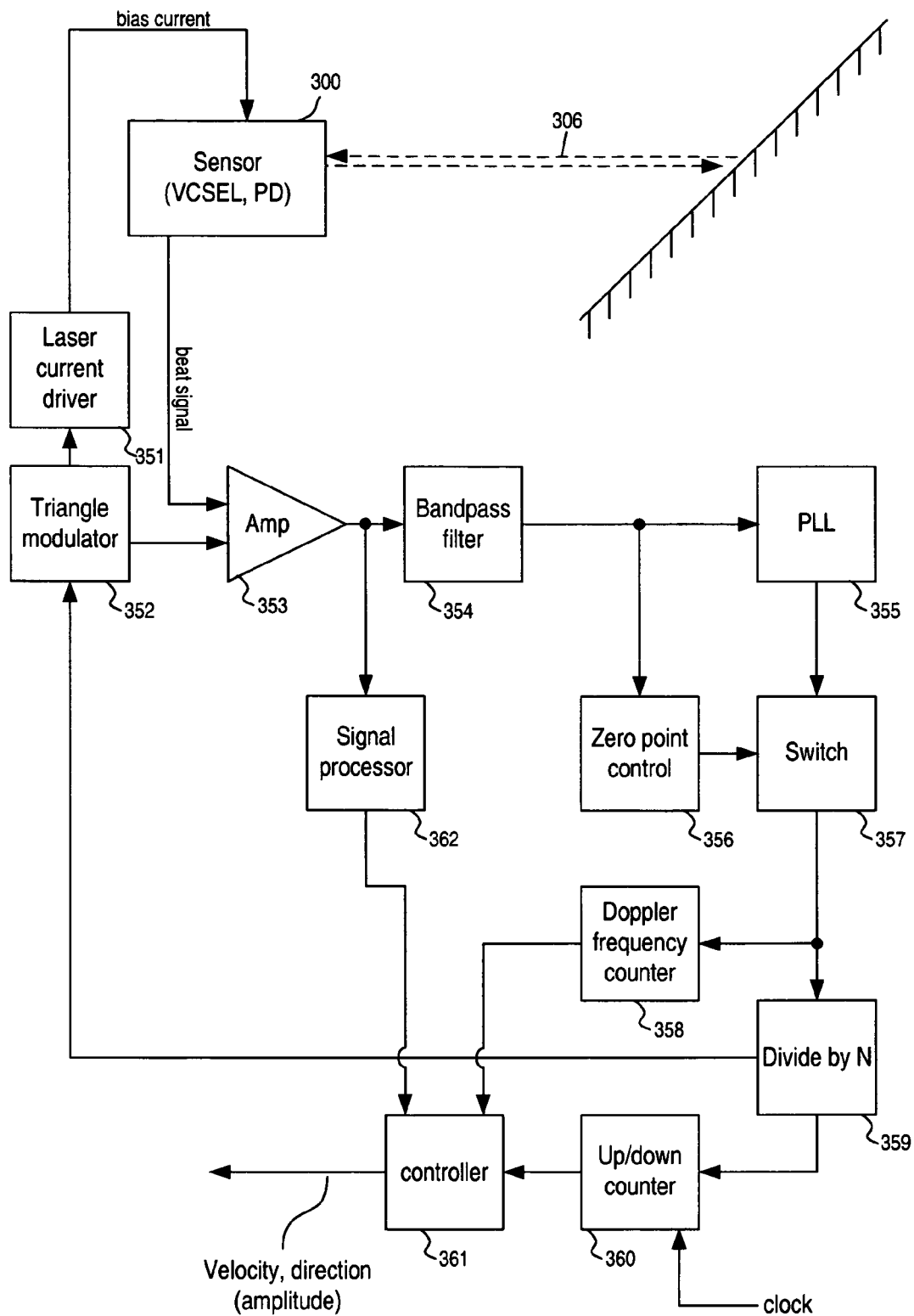
FIG. 23A is a block diagram of another illustrative embodiment of processing circuitry for determining speed and direction of a moving surface.

FIG. 23A is a block diagram for another example of beat signal processing circuitry which could be used in connection with the embodiments of FIGS. 3, 9 and 16, and that addresses some of the possible problems associated with the circuitry of FIG. 22. Sensor 300 is substantially identical to sensor 300 of FIG. 22, and includes a VCSEL and a PD (not shown in FIG. 23A). As in the embodiment of FIG. 22, the VCSEL of sensor 300 is driven by a triangularly modulated biasing current received from a current driver 351. Similar to the embodiment of FIG. 22, current driver 351 is controlled by triangle modulator 352. Unlike triangle modulator 316 of FIG. 22, however, triangle modulator 352 does not modulate at a constant reference frequency. As explained in more detail below, the frequency of the triangle wave by which modulator 352 controls driver 351 is varied based on the Doppler frequency $F_D$.

Returning to sensor 300, the beat signal output by the PD is fed to amplifier 353 so as to increase the strength of the beat signal. Also input to amplifier 353 from modulator 352 is the frequency of the triangle wave used to control driver 351. Because the VCSEL of sensor 300 is being driven with a triangle wave bias current, the beat signal will include a harmonic having the triangular wave frequency (even in the absence of any movement of the target surface). Accordingly, amplifier 353 also subtracts the triangle wave frequency from the beat signal. The output of amplifier 353 is then input to bandpass filter 354 to remove frequencies outside a predetermined range. The output from bandpass filter 354 is then input to analog phase locked loop (PLL) 355 for additional noise reduction.

Because analog PLLs have good noise rejection and amplitude modulation rejection qualities, they can be used to regenerate a less-noisy version of a noisy input signal. In particular, an analog PLL can be used to enhance the accuracy with which Doppler frequency and velocity are measured. However, conventional analog PLLs have a limited "lock" range of approximately ±20% of the center frequency of the voltage controlled oscillator (VCO) in the PLL. In other words, such a PLL would only be able to reproduce input frequencies that are within 20% of the VCO center frequency. If a conventional analog PLL were used in the system of FIG. 23A, the system would be limited to measuring velocities that are within 20% of some reference velocity.

In the processing circuitry of FIG. 23A, these limitations are avoided through use of a difference frequency analog phase locked loop (DFAPLL). In particular, a VCO of the analog PLL has a center frequency which is substantially higher than the highest expected beat signal frequency, but which also has a frequency response which is sufficiently wide. A frequency downconverter is then used to subtract a reference frequency from the VCO output. Because the lock-in range of a DFAPLL can be quite large (e.g., 2 KHZ~1 MHZ), a DFAPLL can be used to expand the velocity measurement dynamic range.

Figure 23B:
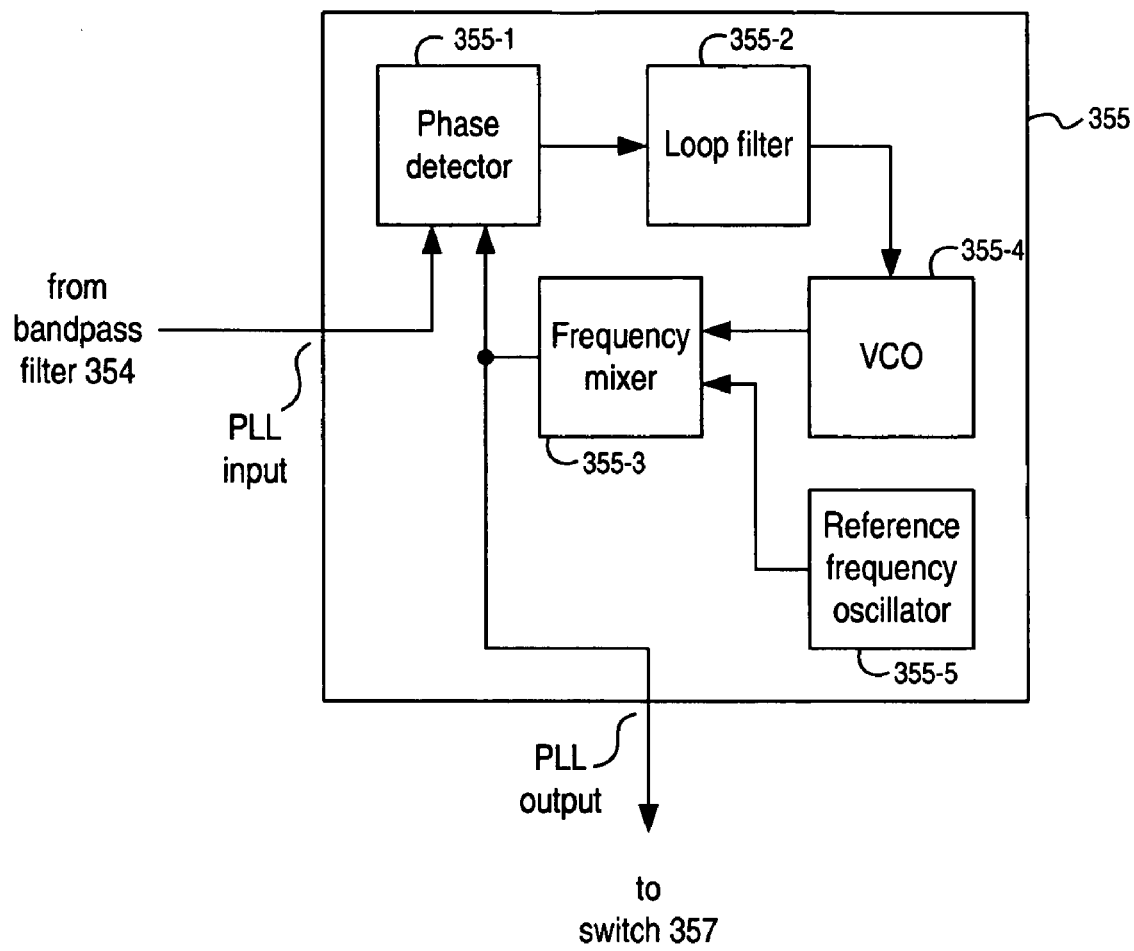
FIG. 23B is a block diagram of the phase locked loop of FIG. 23A.

The details of PLL 355 are shown in more detail in the block diagram of FIG. 23B. The signal from bandpass filter 354 (e.g., the amplified and filtered beat signal) is input to phase detector 355-1. Phase detector 355-1 measures the difference in phase between the beat signal frequency and the output from frequency mixer 355-3, which is discussed below. The phase difference signal from phase detector 355-1 is then filtered by loop filter 355-2 and fed to VCO 355-4. Similar to conventional PLLs, VCO 355-4 then adjusts its output frequency based on the phase difference signal. Specifically, if the beat signal frequency is lower than the other frequency input to phase detector 355-1 (i.e., the input received from mixer 355-3), VCO 355-4 decreases its output frequency. If the beat signal frequency is higher than the other frequency input to phase detector 355-1, VCO 355-4 increases its output frequency.

The output of VCO 355-4 is fed to mixer 355-3. Also fed to mixer 355-3 is a reference frequency generated by reference frequency oscillator 355-5. In mixer 355-3, the frequency of the signal output by VCO 355-4 is reduced (or "downconverted") by the reference frequency from oscillator 355-5. The downconverted output from mixer 355-3 is then fed to phase detector 355-1. As previously indicated, phase detector 355-1 compares the beat signal with the output from mixer 355-3 to generate the phase difference signal. Because VCO 355-4 continually adjusts its output so as to reduce the phase difference signal, and because the VCO output is frequency downconverted in mixer 355-3 so as to be within the range of the beat signal frequency, the output from mixer 355-3 will match the beat signal frequency once PLL 355 reaches equilibrium. However, the output of mixer 355-3 is a purified form of the signal received from bandpass filter 354. In particular, processing by PLL 355 removes noise in the beat signal caused by things such as speckling of beam 306 on the target surface. This purified version of the beat signal is output from PLL 355 to switch 357.

The signal from switch 357 is provided to Doppler frequency counter 358 and to divider block 359. In Doppler frequency counter 358, the Doppler frequency is determined by counting the beat signal cycles. Because current modulation causes the VCSEL to have different frequencies on the up- and downslopes of the triangle wave, beat signal cycles are counted over an entire triangle wave period. Frequency counter 358 then provides the Doppler frequency to controller 361. Controller 361 (which may be, e.g., a microprocessor) then converts the Doppler frequency from counter 358 into the speed of the target surface relative to sensor 300.

In divide-by-N block 359, the frequency of the signal from switch 357 is reduced to a submultiple. In at least some embodiments, the frequency of the signal received at block 359 is divided by 16 (i.e., N=16). Of course, other submultiples could be used. The divided-down signal from block 359 is then provided to triangle modulator 352 and to the up/down control of counter 360. Modulator 352 uses the signal received from block 359 to set the frequency of the triangle wave used to modulate current driver 351. The direction in which a surface is moving relative to sensor 300 can be determined by comparing the time needed for N/2 beat signal cycles on the triangle wave downslope with the time needed for N/2 beat signal cycles on the triangle wave upslope. If the time for N/2 cycles on the triangle wave downslope is longer than the time for N/2 cycles on an adjacent triangle wave upslope, then the target surface is moving away from sensor 300. Conversely, if the time for N/2 cycles on the triangle wave downslope is less than the time for N/2 cycles on an adjacent triangle wave upslope, then the target surface is moving toward sensor 300.

Because the triangle wave modulating the bias current for the VCSEL is locked to a submultiple of the beat signal frequency, there will be the same number of beat frequency cycles (N/2) on the up- and downslopes of the triangle wave. Accordingly, the duration of the up- and downslopes can be measured instead of repeatedly counting N/2 beat frequency cycles. As indicated above, up/down counter 360 receives an output from divide-by-N counter 359. Up/down counter block 360 also receives a separate high-frequency clock signal (with fixed time units) and counts the number of high frequency clock cycles on the up- and downslopes. In particular, the output of the divide-by-N counter (block 359) controls the counting direction of up/down counter 360. Counter 360 counts up on the triangle wave upslope and down on the triangle wave downslope. If the upslope period is longer than the downslope period, counter 360 will not underflow. If the downslope period is longer than the upslope period, counter 360 will underflow. In this manner, the borrow output (not shown) of counter 360 can be used as the direction indicator.

Returning to block 354 of FIG. 23A, the output from bandpass filter 354 is also provided to zero point control block 356. In block 356, the amplitude of the signal from bandpass filter 354 is averaged over a suitable interval. If the average is less than a predetermined threshold, the output from PLL 355 is disabled by opening switch 357. In this manner, the velocity calculation is temporarily disabled while the target surface velocity is too small to be reliably measured.

When used with the embodiment of FIGS. 1 and 3, the signal from amplifier 353 is also processed in signal processor 362 to provide a signal indicative of the amplitude of the beat signal. This processing can be performed in various manners known in the art, the selection of which will depend on the measure used for beat signal amplitude (e.g., RMS voltage, peak-to-peak voltage). The amplitude information output from signal processor 362 is provided to controller 361 for forwarding with velocity and direction information.

Although examples of carrying out the invention have been described, those skilled in the art will appreciate that there are numerous variations and permutations of the above described devices that fall within the spirit and scope of the invention as set forth in the appended claims. As but one example, other types of laser velocimeters could be used with the embodiments of FIGS. 8 and 15 (e.g., triangulation-based velocimeters). As but another example, a scanners similar to the embodiments in FIGS. 1, 8 and 15 could be incorporated into a device (e.g., a computer mouse) having additional functions. It is to be understood that the subject matter defined in the appended claims is not necessarily limited to the specific features or acts described above. Rather, the specific features and acts described above are disclosed as example forms of implementing the claims.

The invention claimed is:

1. A device for scanning a surface, comprising:
a housing having a scanning area defined therein;
a self-mixing laser sensor positioned in the housing to direct a laser beam through the scanning area, wherein, when the scanning area is moved across a scanned surface:
the laser beam is directed through the scanning area to the scanned surface and light backscattered from the scanned surface is received by the laser sensor, and
the laser sensor outputs a signal having a frequency indicative of a velocity of the scanned surface relative to the scanning area and having an amplitude indicative of a color of a portion of the scanned surface struck by the laser beam; and
at least one processor configured to:
determine a velocity, relative to the scanned surface, based on the sensor output signal frequency,
determine dimensions of a first type of region on the scanned surface and of a second type of region on the scanned surface, wherein the first type of region is more darkly colored than the second type of region,
receive multiple sets of data, each of the data sets including a velocity, a time and an amplitude,
calculate multiple distances using the velocities and times in the data sets,
determine, during a single scan, dimensions of multiple first type regions and of multiple second type regions on the scanned surface, and
determine whether each of the calculated distances is a distance across one of the first type regions or across one of the second type regions.

2. The device of claim 1, wherein the laser sensor includes a vertical cavity surface emitting laser and the processor is configured to determine widths of bands in a bar code.

3. The device of claim 1, wherein the laser sensor includes an edge emitting laser diode and the processor is configured to determine widths of bands in a bar code.

4. The device of claim 1, wherein the processor is configured to determine whether each of the calculated distances is a distance across a first type region or across a second type region by:
comparing amplitudes from the multiple data sets associated with the calculated distances, and
identifying transitions between first and second type regions based on changes in compared amplitudes.

5. The device of claim 4, wherein the processor is configured to identify a transition from a first type of region to a second type of region based on an increase in amplitude.

6. The device of claim 5, wherein the processor is configured to identify a transition from a first type of region to a second type of region based on a ratio of first type region amplitude to second type region amplitude of approximately 2:3.

7. The device of claim 1, wherein the processor is further configured to distinguish between the first type of region and the second type of region based on the amplitude of the sensor output signal, and wherein the determined dimensions correspond to regions of the scanned surface over which the scanning area was moved at a non-constant speed.

8. A device for scanning a surface, comprising:
a housing having a scanning area defined therein;
an imaging array;
a first laser sensor positioned in the housing to direct a first laser beam through the scanning area, wherein, when the scanning area is moved across a scanned surface:
the first laser beam is directed through the scanning area to the scanned surface and light backscattered from the scanned surface is received by the first laser sensor,
the first laser sensor outputs a signal indicative of a velocity of the scanned surface relative to the scanning area, and
the imaging array is positioned to receive light reflected from a portion of the scanned surface through the scanning area; and
at least one processor configured to:
determine velocities, relative to the scanned surface, based on the sensor output signal,
generate image frames based on light received by the imaging array,
calculate displacements between image frames based on the determined velocities, and
wherein the first laser sensor is a self-mixing sensor, wherein the first laser sensor output signal has a frequency indicative of the velocity of the scanned surface relative to the scanning area, wherein the at least one processor is configured to:
receive multiple sets of data, each of the data sets including a velocity of the scanning area relative to the scanned surface and a time, at least some of the data sets corresponding to velocity measurements performed between generation of two successive image frames,
calculate multiple distances based on velocities and times in the multiple sets of data, and
calculate displacements between image frames based on the calculated distances.

9. The device of claim 8, wherein the first laser sensor is a self-mixing sensor and includes a vertical cavity surface emitting laser, wherein the first laser sensor output signal has a frequency indicative of the velocity of the scanned surface relative to the scanning area, and further comprising an alternate light source to generate the light reflected from a portion of the scanned surface and received by the imaging array.

10. The device of claim 8, wherein the first laser sensor is a self mixing sensor and includes a edge emitting laser diode, wherein first laser sensor output signal has a frequency indicative of the velocity of the scanned surface relative to the scanning area, and further comprising an alternate light source to generate the light reflected from a portion of the scanned surface and received by the imaging array.

11. The device of claim 8, wherein the first laser sensor is a self-mixing sensor, wherein the first laser sensor output signal has a frequency indicative of the velocity of the scanned surface relative to the scanning area, and wherein the at least one processor is configured to calculate displacements between image frames in two directions.

12. The device of claim 11, further comprising a second self-mixing laser sensor positioned in the housing to direct a second laser beam through the scanning area, wherein, when the scanning area is moved across a scanned surface:

the first laser sensor outputs a signal having a frequency indicative of a velocity of the scanned surface, relative to the scanning area, in a first of the two directions, the second laser beam is directed through the scanning area to the scanned surface and light backscattered from the scanned surface is received by the second laser sensor, and the second laser sensor outputs a signal having a frequency indicative of a velocity of the scanned surface, relative to the scanning area, in a second of the two directions.

13. The device of claim 8, wherein the first laser sensor is a self-mixing sensor, wherein the first laser sensor output signal has a frequency indicative of the velocity of the scanned surface relative to the scanning area, and wherein the determined velocities correspond to movement of the scanning area across the scanned surface, between successive image frames, at a non-constant speed.

* * * * *